United States Patent
Brady, Jr. et al.

(10) Patent No.: US 7,725,569 B2
(45) Date of Patent: May 25, 2010

(54) METHOD AND SYSTEM FOR CONFIGURATION AND DOWNLOAD IN A RESTRICTED ARCHITECTURE NETWORK

(75) Inventors: Kenneth A. Brady, Jr., Trabuco Canyon, CA (US); Jason Kyong-min Yi, Irvine, CA (US); Andrew W. Weimholt, Mission Viejo, CA (US); Jyh-Fong Tsaur, La Palma, CA (US); Lyle K. Norton, Irvine, CA (US)

(73) Assignee: Thales Avionics, Inc., Edison, NJ (US)

( * ) Notice: Subject to any disclaimer, the term of this patent is extended or adjusted under 35 U.S.C. 154(b) by 899 days.

(21) Appl. No.: 11/218,823

(22) Filed: Sep. 2, 2005

(65) Prior Publication Data
US 2006/0010438 A1  Jan. 12, 2006

Related U.S. Application Data

(63) Continuation of application No. 10/136,237, filed on May 1, 2002, now Pat. No. 6,973,479.

(51) Int. Cl.
G06F 15/177 (2006.01)
G06F 15/173 (2006.01)
G06F 9/00 (2006.01)

(52) U.S. Cl. .................. 709/223; 709/220; 713/100

(58) Field of Classification Search ............... 709/223, 709/220, 221, 222; 713/100; 714/38
See application file for complete search history.

(56) References Cited

U.S. PATENT DOCUMENTS

| | | | |
|---|---|---|---|
| 5,450,589 A | 9/1995 | Maebayashi et al. | |
| 5,752,042 A | 5/1998 | Cole et al. | |
| 5,805,897 A | 9/1998 | Glowny | |
| 5,809,287 A | 9/1998 | Stupek, Jr. et al. | |
| 5,835,911 A | 11/1998 | Nakagawa et al. | |
| 5,845,090 A * | 12/1998 | Collins et al. ............... 709/221 |
| 5,951,639 A | 9/1999 | MacInnis | |
| 5,999,740 A | 12/1999 | Rowley | |
| 6,029,196 A * | 2/2000 | Lenz ........................ 709/221 |
| 6,047,129 A | 4/2000 | Frye | |
| 6,085,030 A | 7/2000 | Whitehead et al. | |
| 6,098,098 A | 8/2000 | Sandahl et al. | |
| 6,151,643 A | 11/2000 | Cheng et al. | |
| 6,195,678 B1 | 2/2001 | Komuro | |
| 6,202,207 B1 | 3/2001 | Donohue | |

(Continued)

Primary Examiner—Joseph E Avellino
Assistant Examiner—Peter Shaw
(74) Attorney, Agent, or Firm—Drinker Biddle & Reath LLP

(57) ABSTRACT

A method and system are provided for updating software configurations of line-replaceable unit (LRU) computers in a restricted architecture network such as an in-flight entertainment system (IFES). Operating in an efficient and parallel manner, each of the LRUs independently creates an individual configuration file that identifies current software components. Each of the LRUs transmits its respective configuration file to a configuration server either automatically upon startup or manually upon request. The configuration server updates a system configuration data file with the current configuration files received from the individual LRUs. In a downloading method, a download server sends a list of desired software components to the LRUs. Each of the LRUs independently and simultaneously transfer (download) the needed software from the download server. The LRU independently requests the download server to download the needed software components. The file transfers utilize standard protocols, such as FTP.

22 Claims, 17 Drawing Sheets

U.S. PATENT DOCUMENTS

| | | |
|---|---|---|
| 6,247,128 B1 | 6/2001 | Fisher et al. |
| 6,266,736 B1 | 7/2001 | Atkinson et al. |
| 6,282,709 B1 | 8/2001 | Reha et al. |
| 6,330,715 B1 | 12/2001 | Razzaghe-Ashrafi |
| 6,334,147 B1 | 12/2001 | Cromer et al. |
| 6,360,334 B1 | 3/2002 | Kavanagh et al. |
| 6,390,920 B1 | 5/2002 | Infiesto et al. |
| 6,438,535 B1 | 8/2002 | Benjamin et al. |
| 6,442,682 B1 | 8/2002 | Pothapragada et al. |
| 6,453,259 B1 | 9/2002 | Infiesto |
| 6,463,535 B1 * | 10/2002 | Drews ........................ 713/176 |
| 6,499,027 B1 | 12/2002 | Weinberger |
| 6,584,499 B1 | 6/2003 | Jantz et al. |
| 6,973,479 B2 * | 12/2005 | Brady et al. ................ 709/203 |
| 2001/0051863 A1 | 12/2001 | Razavi et al. |
| 2003/0093798 A1 * | 5/2003 | Rogerson ..................... 725/75 |
| 2003/0131226 A1 * | 7/2003 | Spencer et al. .............. 713/100 |

* cited by examiner

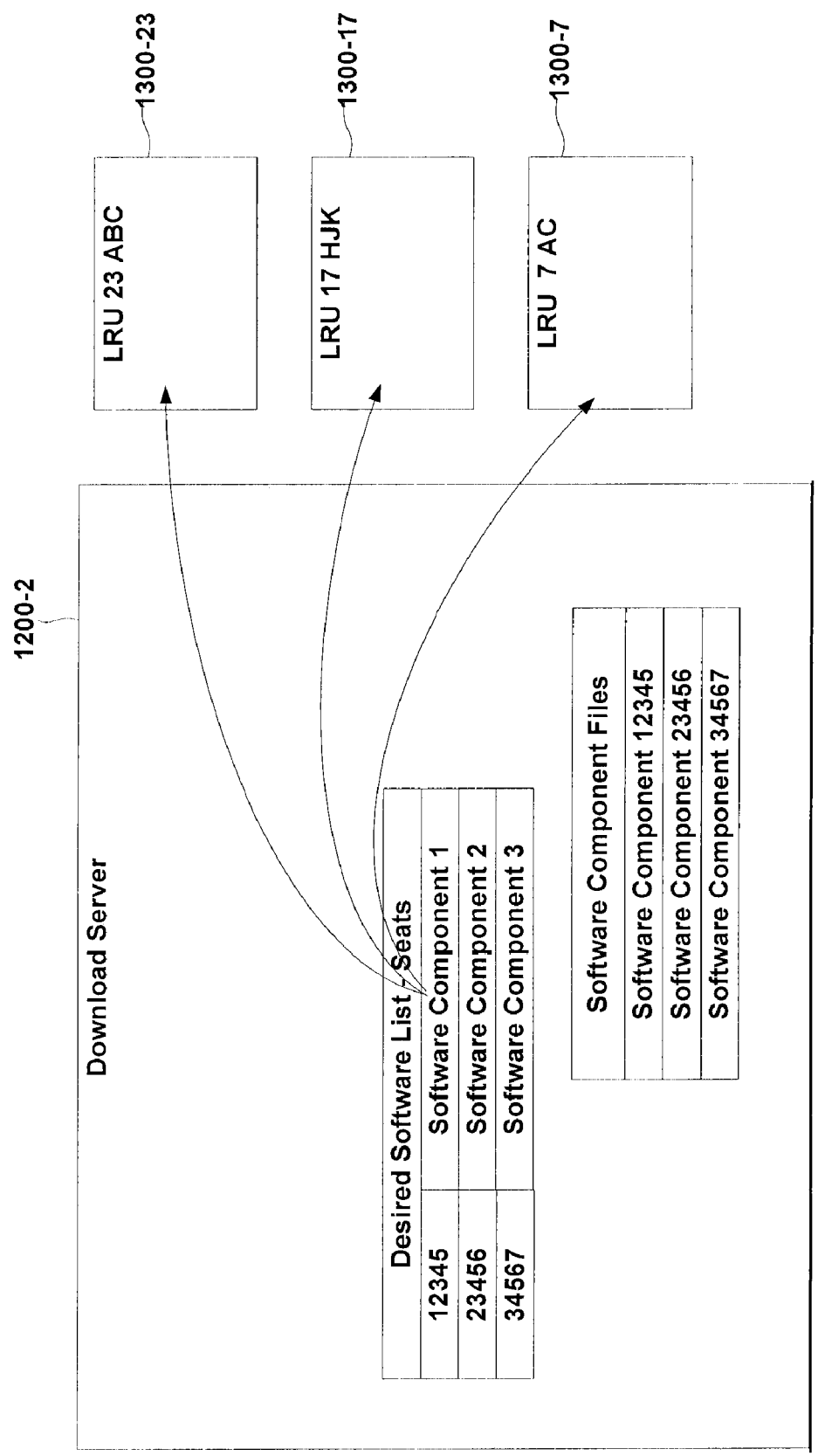

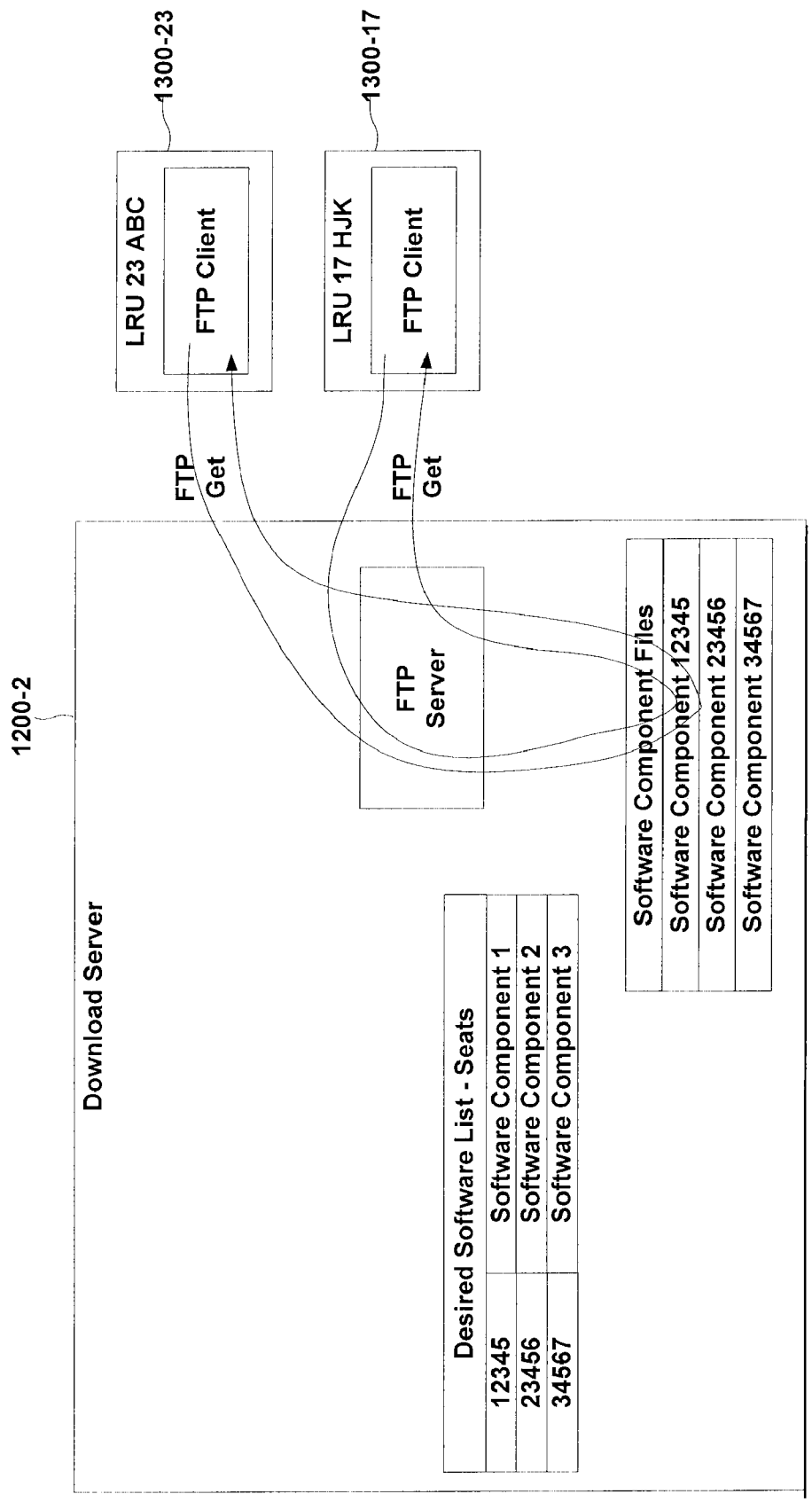

FIG. 7

| LRU | SOFTWARE | PART NUMBER |
|---|---|---|
| LRU1A | | |
| ✓ | Core | 650102A2_2 |
| ✓ | Operating System | 650103A1_1 |
| LRU1B | | |
| ✓ | Core | 650202C2_2 |
| ☐ | Operating System | 650203A1_A |
| LRU2A | | |
| ☐ | Core | 650302B3_2 |
| ✓ | Operating System | 650303A1_1 |
| SYSTEM | | |
| ✓ | Config Data | 650001B1_0 |
| ✓ | System Inventory | 650002A2_2 |

[JAZ] [CD ROM] [FLOPPY]

[DELETE] [PRINT] [DONE]

FIG. 8

| LRU | SOFTWARE | PART NUMBER | STATUS |
|---|---|---|---|
| LRU1A | | | |
| | Core | 650102A2_2 | OK |
| | Operating System | 650103A1_1 | |
| LRU1B | | | |
| | Core | 650202C2_2 | OK |
| | Operating System | 650203A1_A | |
| LRU2A | | | |
| | Core | 650302B3_2 | FAILED |
| | Operating System | 650303A1_1 | OK |
| SYSTEM | | | |
| | Config Data | 650001B1_0 | |
| | System Inventory | 650002A2_2 | |

UPDATE    DONE

FIG. 9

| LRU | SOFTWARE | PART NUMBER |
|---|---|---|
| ☑ LRU GROUP 1 | Core | 650102A2_2 |
| | Operating System | 650103A1_1 |
| ☑ LRU GROUP 2 | Core | 650202C2_2 |
| | Operating System | 650203A1_1 |
| ☑ LRU GROUP 3 | Core | 650302B3_2 |
| | Operating System | 650303A1_1 |
| ☐ LRU GROUP 4 | Core | 650302B3_3 |
| | Operating System | 650303A1_1 |
| | Basic App | 650001B1_0 |
| SYSTEM | | |
| ▨ | Config Data | 650001B1_0 |
| ▨ | System Inventory | 650002A2_2 |

[ ALL ]  [ SINGLE ]  [ DONE ]

METHOD AND SYSTEM FOR CONFIGURATION AND DOWNLOAD IN A RESTRICTED ARCHITECTURE NETWORK

CROSS-REFERENCE TO RELATED APPLICATIONS

This patent application is a continuation of copending U.S. patent application Ser. No. 10/136,237, filed May 1, 2002, allowed, herein incorporated by reference in its entirety.

FIELD OF THE INVENTION

The invention generally relates to computer networks and more particularly relates to a method and system of maintaining uniform software configurations of multiple computers in a restricted architecture network, such as in a system for providing passenger entertainment, communication or other services in the cabin of an airplane or other vehicle.

BACKGROUND OF THE INVENTION

A restricted architecture network is used, for example, to provide entertainment or other services to passengers on board an aircraft, commonly referred to as an in-flight entertainment system (IFES). In an IFES, a plurality of computers are connected to provide various functions. These computers include, for example, audio/video headend equipment, area distribution boxes, passenger service systems (PSS), and seat electronic boxes. In the modular environment of a restricted architecture network, each of these computers is referred to as a line replaceable unit ("LRU"). At least some of the LRUs act as client devices serving passenger seats individually or by seat groups to display video entertainment or instructional presentations, to receive input for selection of audio/video or PSS choices, to provide telephony or communication capabilities, to play interactive games, or to provide other similar kinds of services.

When a plurality of computers are run within a restricted architecture network, such as within an IFES, it is absolutely necessary for the software configurations on each of the respective computers to be maintained according to exact specifications. The software configuration, including an exact number of identifiable software components, must be maintained: all of the software components specified as part of the software configuration must be present; no software components not specified must be present. Proper IFES maintenance requires the checking of the software configurations of the various LRUs within the restricted architecture network and the subsequent downloading of software to the LRUs to update available selections and services or to diagnose and fix any problems.

Restricted architecture networks, thus, have serious constraints on their structure and function. Such a network usually has a limited amount of physical space available for the hardware and connections between discrete hardware components. The amount of power or bandwidth for connections available may be limited. The origin of these constraints, as well as the need for absolute consistency in software configuration within the restricted architecture network may arise from the requirements placed on such systems by external agencies, such as the Federal Aviation Administration (FAA). The FAA requires, for example, that only thoroughly tested software configurations be allowed to run within a restricted architecture network. The risk that an LRU with a slightly different software configuration might disable the function of the entire network, or of flight computers on the aircraft, is too great to allow a single discrepancy. Thus, a method for configuring LRUs within a restricted architecture network must be perfectly consistent and reproducible; but maintaining near perfect consistency often requires an expensive, labor intensive method.

The time availability for conducting IFES hardware and software maintenance is also limited to the short maintenance window between flights as a plane sits at a gate for unloading and loading. The software configuration of each of the computers within the IFES system must be setup and tested during this limited maintenance time window. In practice, if the IFES configuration and download method exceeds the otherwise scheduled maintenance period, operators will avoid initiating or abort the IFES maintenance. As a result, it is desirable to optimize the speed and efficiency of the method of configuring and downloading software to computers in an IFES. In conventional systems, during hardware installation, e.g., during the removal or addition of a seat electronics box, software cannot be updated or configured—the entire hardware configuration must be in place before software configuration can be begin. Accordingly, the required service time has been the time for hardware configuration plus software configuration. The time window of opportunity to perform such a service task while a plane is on the ground is very limited.

Maintenance personnel are expensive overhead for an airline. In order to minimize the number of required IFES maintenance personnel, and to minimize the required training and skill level for conducting basic IFES maintenance tasks, it is desirable to provide an IFES configuration and download method which is reproducable and reliable.

Conventional methods and systems for maintaining the software configuration on the plurality of computers within an IFES are not usually implemented in a network, and are based on the use of a "master" computer, hard-wired to other computers within the system, which polls each "slave" computer for its current configuration, tabulates a list of the software configuration on each computer, and downloads to or deletes from a particular computer the necessary software components.

The downloading, deleting or overwriting of software components has been conventionally performed in a sequential manner, software component by software component. Each computer must wait for each of a series of missing software components to be downloaded, one at a time. The conventional configuration method is initiated, for example, when an operator selects a particular software component to be downloaded to the plurality of computers within the system. Conventionally, the master computer downloads the selected software component in a sequential manner to a first slave computer, then to a second slave computer, then to a third slave computer, and so on. Furthermore, the IFES configuration and download method conventionally operates in a completely serial manner among the IFES computers, i.e., the master computer connects only to one slave computer at a time, and downloads only one software component to that slave computer at a time.

The conventional serial and sequential downloading techniques have impaired the development of IFES systems, as each additional computer or configurable software component increases the required maintenance time and method complexity, thereby increasing the possibility of system error and failure. At present, an IFES might consist of close to one thousand separate, configurable computers, each with a software configuration that must be perfectly maintained. The exceptional difficulty of accomplishing this task as the number of LRUs within a restricted architecture network multiplies makes it desirable to provide a configuration checking and software downloading method that operates in a parallel manner. More particularly, it is desirable to provide a system and method wherein a master computer connects to more than one slave computer at a time or downloads more than one software component to a slave computer at a time.

A conventional IFES has operated on custom, proprietary software and hardware, including proprietary protocols for signal transmission within the IFES network. Due to a complex and unique nature of such proprietary systems, problems in the IFES have been difficult to diagnose and fix.

As a result, a need exists for an improved method and system for configuring the software of a multi-computer system within a restricted architecture network.

SUMMARY OF THE INVENTION

The foregoing complications and difficulties attending the configuration and download of software within a restricted architecture network are overcome by the method and system for configuring and downloading software that is substantially described herein.

According to an embodiment of the present invention, software configuring and downloading is performed with the parallel, multi-access abilities of established Internet transfer protocols, such as Transmission Control Protocol/Internet Protocol (TCP/IP) and File Transfer Protocol (FTP). In an embodiment, an LRU within the system is selected to act as a configuration server, and an LRU within the system is selected to act as a download server. The LRU selected to act as the configuration server may act also as the download server, or the LRUs selected to act as servers may be two different LRUs. The system and method of the present invention provide for flexibility and modularity within the system by allowing for any of a plurality of LRUs within the system to act as either the configuration server, the download server, or both. In another embodiment of the present invention, more than one configuration or download server might be implemented, allowing for redundancy within the system, and for incremental increases in the capacity of the system. As is known to those of ordinary skill in the art, it is not necessary to the present invention that one particular LRU within the restricted architecture network be selected to act as either the configuration or the download server.

The configuration server is provided to check the configuration of multiple LRUs within the system. The download server is provided to allow for the download of software to multiple LRUs within the system. Configuration and download activities are thus limited only by the number of simultaneous FTP sessions that the configuration and download servers can handle. Hence, the time required for a complete configuration of the system is limited primarily by the network bandwidth and the performance of the configuration and download servers.

The steps provided herein for configuring and downloading are useful as a method for diagnosing and repairing problems in an IFES having a plurality of configurable LRUs. The steps are also useful for performing routine updating of an IFES to maintain a desired uniform configuration among at least a group of the LRUs or to provide new features and amenities.

In an embodiment, a method is provided for checking the configuration of a plurality of configurable LRUs in an IFES aboard an aircraft. The IFES includes at least one configuration server in communication over a network with the LRUs. The method for checking the configuration includes the following steps: (a) generating an LRU configuration file at the LRU, the LRU configuration file containing a list that identifies software components currently residing on the LRU; (b) sending the configuration file from the LRU to the configuration server, the configuration server holding the LRU configuration file in a working directory; (c) detecting the arrival of a configuration files in the working directory; (d) updating a system configuration data file (SCDF) that contains data representing current and previous LRU configurations by setting the current SCDF data to reflect the LRU configuration file generated by the generating step and by setting the previous SCDF data to reflect an LRU configuration file generated by the LRU during a previous running of the configuration checking method; and (e) deleting the LRU configuration file from the working directory. The foregoing steps are executable in parallel and independently for each respective LRU to be checked. Additionally, in an embodiment, at least part of the SCDF is stored, in a database on the configuration server, or on any of the LRUs within the system. Preferably, the step of sending the configuration file is performed under a standard network protocol, such as FTP.

In an embodiment, the step of generating the LRU configuration file is automatically performed upon startup of the respective LRU. Alternatively, the step of generating the LRU configuration file can be manually initiated, wherein the method further includes sending an initiation request from the configuration server to the LRU.

In some applications, it is desirable to maintain an event log containing a history of configuration changes. Therefore, in an embodiment, the method further includes comparing the LRU current configuration file to a previous configuration file from the LRU, determining inconsistencies therebetween, and writing the inconsistencies to an event log.

In the event that an LRU is slow to respond, it is desirable that the system does not passively wait an indefinite period for the LRU to report. Active polling steps are optionally provided to avoid problematic delays. More particularly, in an embodiment, the method further provides sending an initial instruction from the configuration server to the LRU to perform the generating step, waiting a first predetermined period, then checking the working directory after the first predetermined period to determine whether the LRU configuration file has been received by the configuration server. Furthermore, if the LRU configuration file has not been received, the method further actuates the sending of a second instruction from the configuration file to the LRU to perform the generating step, waiting a second predetermined period and then again checking the working directory to determine whether the LRU configuration file has been received. If the LRU configuration file has not been received after the second predetermined period, the configuration server indicates that the LRU has failed to report.

Preferably, the checking method includes the step of storing the configuration file at the associated LRU after the step of generating the configuration file. This is useful to expedite additional steps provided for downloading needed software components to the target LRUs.

In an embodiment, a method is further provided for downloading software from a download server to one or more configurable LRU computers in an IFES aboard an aircraft, the downloading method including: selecting a list of desired software components representing software desired to be loaded onto one or more target LRUs; sending the list of desired software components from the download server to each of the target LRUs; comparing the list of desired software components at each LRU against a respective list of current software components at each of the LRUs; determining needed software components from inconsistencies between the list of desired software components and the list of current software components; sending an instruction from each of the LRUs to the download server to download the needed software components to the respective LRU; downloading the needed files to the LRU; and deleting unnecessary software components from the LRU. The downloading method preferably implements a standard protocol such as FTP for file transferring steps, including the step of sending the list of desired software components from the download server to each of the LRUs. More particularly, the step of sending an instruction from each of the LRUs to download needed software components includes executing an FTP "get" command identifying the needed components.

Although the method for configuration and the method for download are independent in the system of the present invention, there are two places in which they overlap. In the first place, during the method of download, the LRUs receive the desired list of software components from the download server. The desired list of software components is compared with the current list of software components, which is generated with the configuration file during in a step of the method for configuring the LRUs. In the second place, during the method for download, the download server may present a list of the names or number of the LRUs that have reported their configuration. This number is provided in the present embodiment of the invention by the active polling steps in the configuration method.

The independence of the configuration server and the download server is an advantage to the present invention. In an embodiment, several of the LRUs may act as a configuration server, a download server, or both. The use of more than one configuration server or download server allows for network traffic to be dispersed more evenly, alleviating bandwidth related slowing of the method for configuring or the method for downloading software components.

Another aspect of the invention is that it provides a configurable system for use in a restricted architecture network. The system includes at least one server having a memory that maintains a working directory, a storage device that maintains a database, a data parser, and a network communication device. Additionally, the system includes a plurality of configurable LRUs, each of the LRUs including a configuration file generator operable to generate a configuration file representing current software components at the respective LRU; and a network communication device operable to send the configuration file to the server. The system further includes a network backbone for handling parallel communications between the LRUs and the server. For example, the network backbone can be an Ethernet network. The server receives the configuration files from the respective LRUs in the working directory, wherein the data parser is operable to update an SCDF stored in the database by writing the configuration files to a field of the system configuration data file that represents a current configuration, moving data from previously stored in the current field to a field representing the previous configuration. The LRUs preferably send the configuration data files to the server via FTP.

The system is equipped, in an embodiment, to update the LRU software components by downloading desired software over the network. Accordingly, each of the LRUs further includes a comparator to compare the configuration file to a list of desired components received from the configuration server to determine needed components, and wherein the network communication device of the LRU is further operable to send the configuration file to the request a download of the needed components from the server.

To facilitate a manual initiation of the system, in an embodiment, the system includes a management terminal operable to send an initiation request to cause the LRUs to generate the configuration files. Alternatively, the LRUs are operable to initiate themselves. More particularly, the configuration file generator at the LRU is operable to automatically generate the configuration file upon startup of the LRU.

A particular advantage of the present invention is that the sending of files is performed with a standard protocol, such as FTP, that has been established and tested outside restricted architecture networks. The use of standard protocols avoids complications and difficulties inherent in the use of a proprietary protocols within such environments. Standard protocol software, such as FTP client and FTP server software, are commonly provided with commercially available operating system software, and are otherwise simple to write and compile for platforms typically used in a restricted architecture network. Advantageously, the system and method of the invention avoid a need to create or use proprietary software protocols for use in maintaining a software configuration. In addition, the present invention avoids a need to combine individual software components to configure all of the computers.

A significant advantage of the present invention is that the software configuration of the computers within a restricted architecture network can be updated even when the hardware configuration is not complete. In a system including a plurality of line replaceable units (LRUs), a configuration checking method or downloading method can be performed on one or more selected LRUs or on all LRUs. Additionally, in an embodiment, the downloading of software is individualized to provide only software components needed by the respective LRU. As a result, there is no need for the entire system to be operational in order for one LRU to complete its software configuration. This results in restricted maintenance times and high operational efficiency.

BRIEF DESCRIPTION OF THE DRAWINGS

The foregoing and other objects, advantages, and features of the present invention will be apparent from the following detailed description and the accompanying drawings, in which:

FIG. 6a is a schematic diagram of the download server sending lists of desired software components to the target LRUs;

FIG. 6c is a schematic diagram of LRUs obtaining needed software components from the download server using an FTP "get" command;

FIG. 7 is a diagram of an exemplary system configuration GUI which can be used in accordance with a method of the invention;

FIG. 8 is a diagram of an exemplary media selection GUI which can be used in accordance with a method of the present invention; and FIG. 9 is a diagram of an exemplary LRU selection GUI which can be used in accordance with a method of the present invention.

DETAILED DESCRIPTION OF THE PRESENTLY PREFERRED EMBODIMENTS

Figure 1:
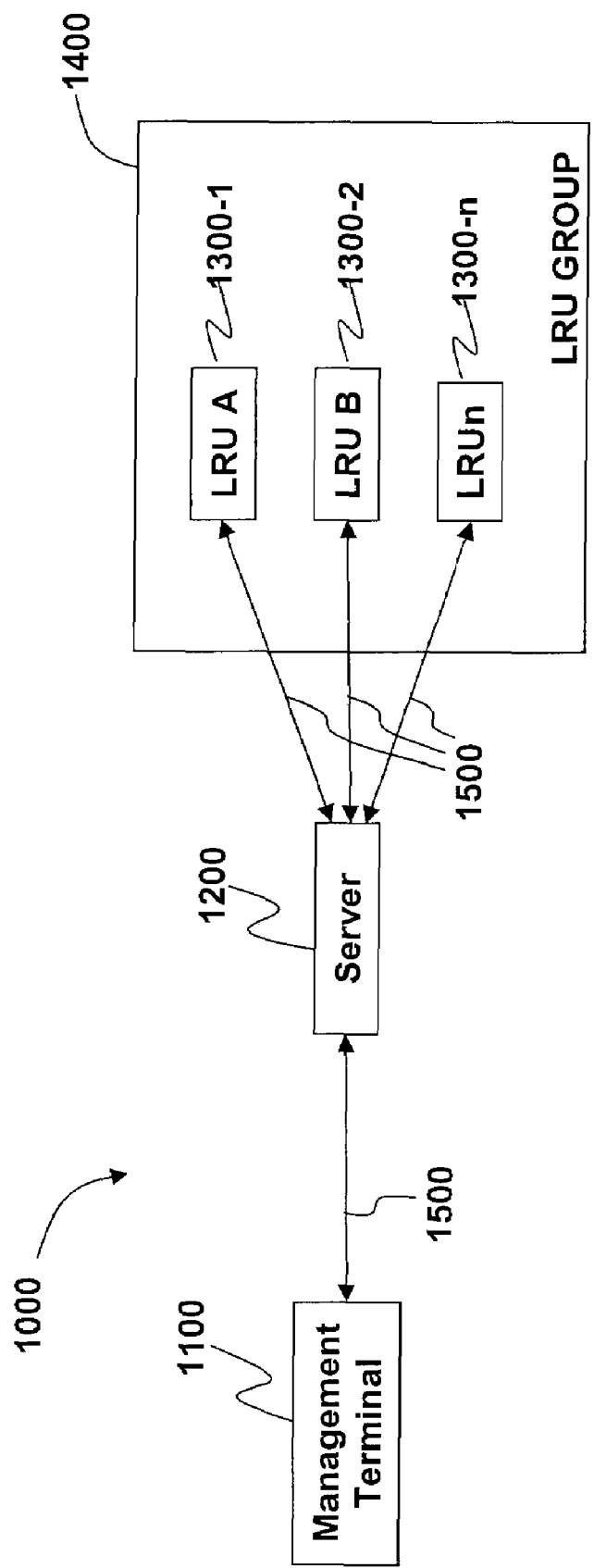
FIG. 1 is a block diagram of a multi-computer system for checking the configuration of, and downloading software to, computers within a restricted architecture network according to an embodiment of the present invention.

While the present invention is susceptible to various modifications and alternative forms, certain preferred embodiments are shown by way of example in the drawings and will be described in detail herein. It should be understood, however, that the description is not intended to limit the invention to the particular forms described; to the contrary, the description is intended to cover all modifications, alternatives, and equivalents falling within the spirit and scope of the invention defined by the appended claims.

FIG. 1 illustrates an exemplary network or system 1000 suitable for a restricted architecture network, such as an IFES. The block diagram of FIG. 1 provides a general hardware layout of computers capable of executing electronic instructions and for running or storing software and data. According to an embodiment of the present invention, the system 1000 generally includes a management terminal 1100, at least one server 1200, and a plurality of configurable computers or LRUs (e.g., LRUs 1300-1, 1300-2 . . . 1300-n) which can be referred to generically herein as an "LRU 1300" or "LRUs 1300"), including a particular LRU 1300-n (labeled "LRUn"), which will be used for descriptive purposes as representative of any of the LRUs 1300 within the system 1000. As indicated, the LRUs 1300-1, 1300-2 . . . 1300-n can be part of an LRU Group 1400. The management terminal 1100 is operable to receive input data from, and to provide output data to, a user. For example, the management terminal 1100 preferably has a display on which a graphical user interface (GUI) can be provided. The management terminal 1100 can be an application specific device or a PC such as a laptop computer. Moreover, the management terminal 1100 can be constructed as either a permanently installed fixture or as a portable device installed as needed for development, management or troubleshooting of the system 1000. In a connected state, the management terminal 1100 is in communication with each of the configuration servers 1200.

FIG. 1 also includes the plurality of LRUs 1300. The configurable LRUs 1300 represent the computer components or devices whose software configuration can be reliably and reproducibly controlled. In a restricted architecture network generally, the configurable LRUs 1300 are components that must be diagnosable and repairable in the field when software problems occur. In an aircraft, train, bus, or boat, the configurable LRU 1300 can be, for example, a passenger service or entertainment device integrated with a passenger seat environment. In other environments, the configurable LRU 1300 can be a device to measure and record data. Generally, the system and method of the invention are useful for a system 1000 in which a plurality LRUs 1300. There may be more than a thousand LRUs 1300 within a system, although only three are labeled in FIG. 1.

The system 1000 is generally a LAN that operates according to suitable network standard, such as Ethernet, including 10 Base T, 100 Base T, or Gigabit Ethernet, or a standard other than Ethernet, such as a Token ring standard or a wireless standard. The use of such standards is generally known to those of skill in the art.

Figure 2A:
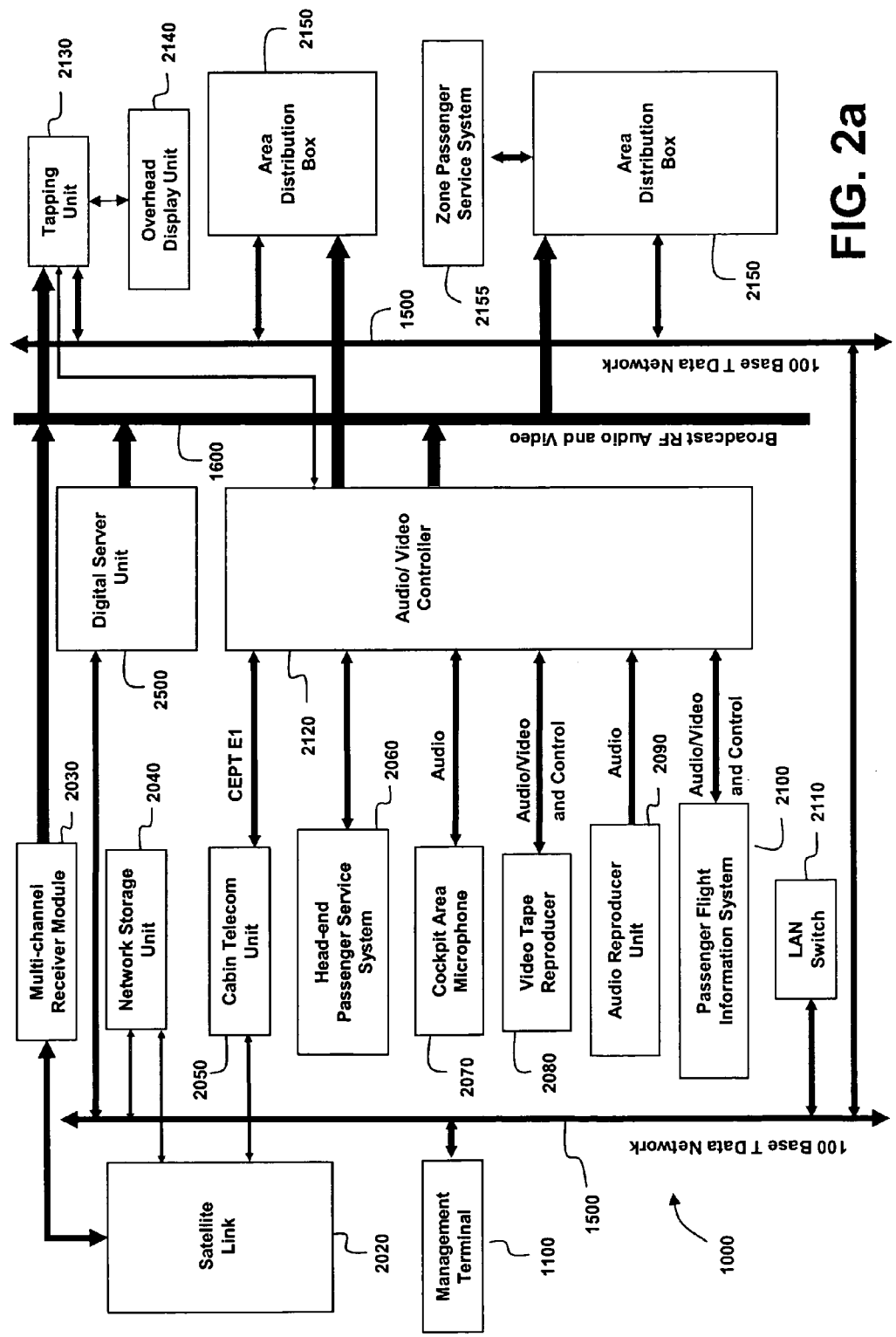
FIG. 2a is a schematic diagram of a first portion of a restricted architecture network including headend components of an in-flight entertainment system having features according to teachings of the invention.
Figure 2B:
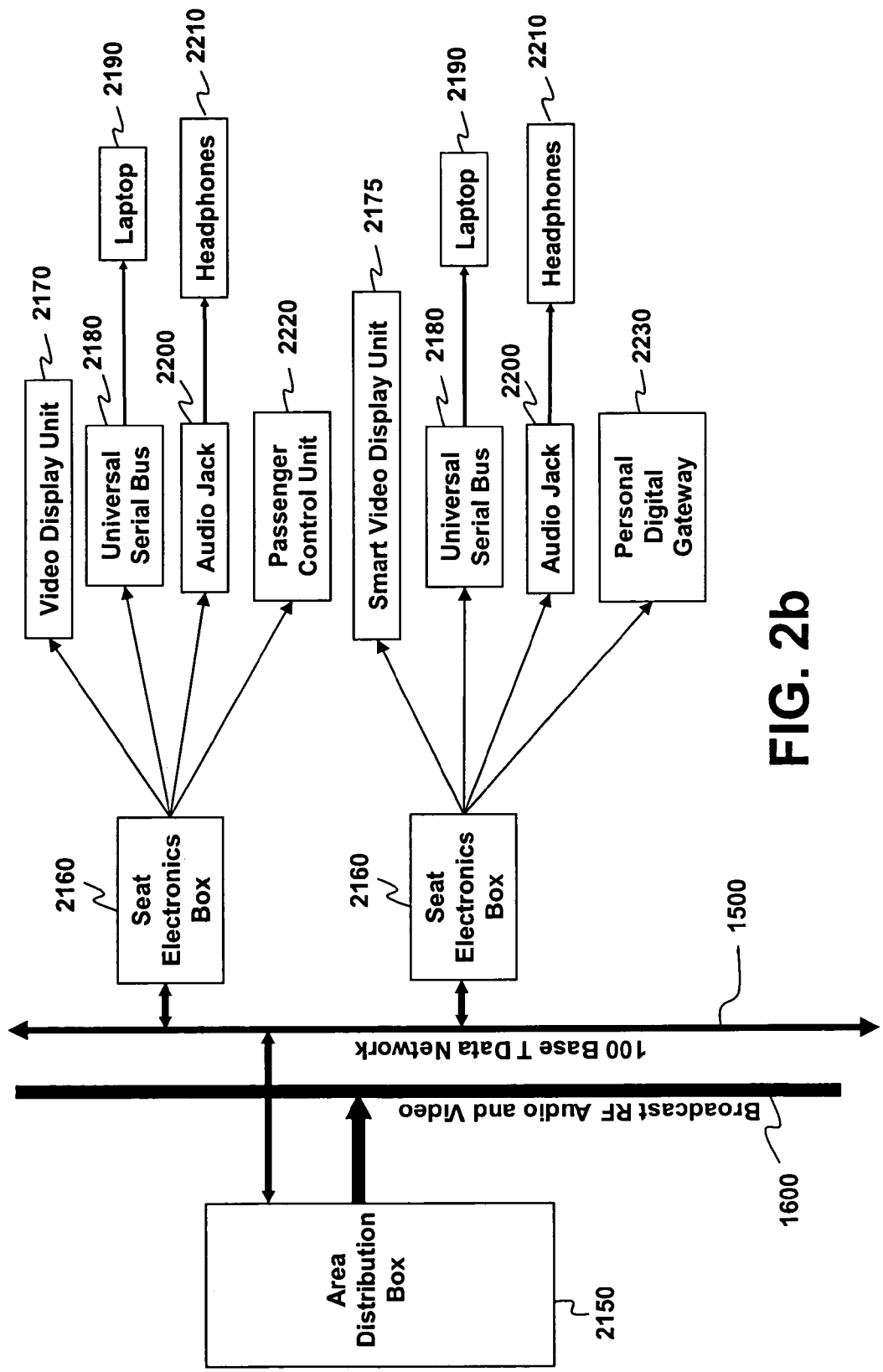
FIG. 2b is a schematic diagram of a second portion of the restricted architecture network including seat-level components.
Figure 2C:
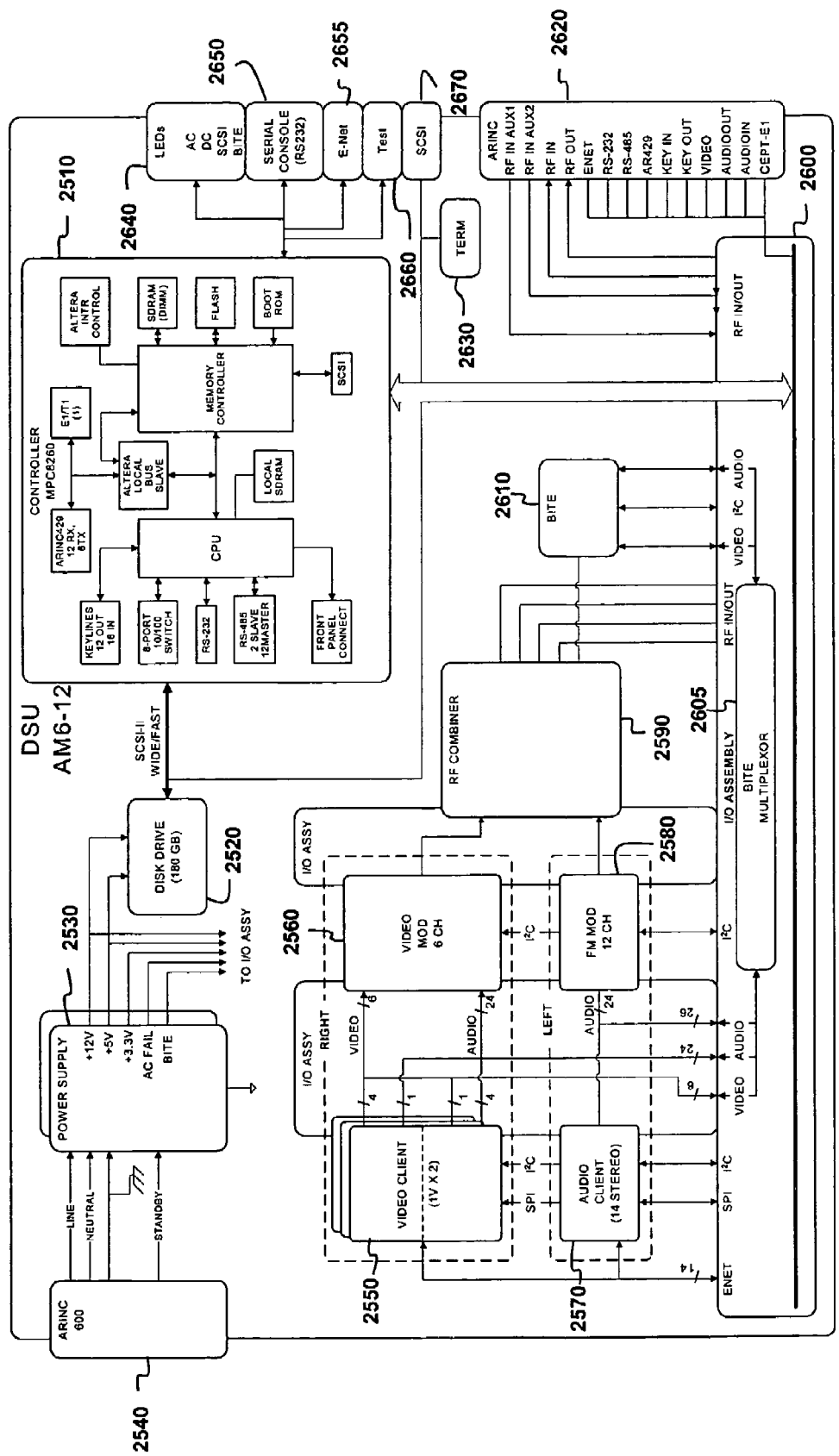
FIG. 2c is a block diagram of a hardware layout for the digital server unit in accordance with an embodiment of the present invention.

FIGS. 2a-2c illustrate in greater detail exemplary hardware comprising the system 1000 (FIGS. 2a-2b) and an example of a digital server unit, which might be used as either the configuration server 1200-1 (see, e.g., FIGS. 4a and 4b), the download server 1200-2 (see, e.g., FIGS. 6a and 6c), or both (FIG. 2c).

The system 1000 is generally a local area network (LAN) comprising a plurality of computer components that communicate over a network data backbone 1500 and an entertainment broadcast or RF backbone 1600. The network data backbone 1500 preferably uses 100 base T Ethernet, and the broadcast RF backbone 1600 is preferably capable of carrying high-bandwidth RF transmissions containing video and audio signals.

Generally, the LRUs 1300 within the system 1000 include cabin management terminal 1100, an audio/video controller 2120, a digital server unit 2500, one or more area distribution boxes 2150 and a plurality of tapping units 2130 in communication over the data backbone 1500. The audio/video controller 2120, digital server unit 2500, and other auxiliary devices can provide audio and video signals over the RF broadcast backbone 1600 to the area distribution boxes 2150 or tapping units 2130. The area distribution box 2150 passes the signal to one or more seat electronics boxes (2160 in FIG. 2b) within its associated area. Alternatively, the tapping unit 2130 receives the entertainment signal from the broadcast backbone 1600 and sends the signal to one or more associated overhead display units 2140.

Cabin Management Terminal

In FIG. 2a, the cabin management terminal 1100 is, in an embodiment, a central user interface to the IFE system for flight crewmembers. Through the cabin management terminal 1100, a user can specify the software configurations of other hardware components within the IFE system 1000. The cabin management terminal 1100 also allows a user to enable or disable the availability of audio/video content or the Internet to passengers on the plane. The cabin management terminal 1100 is connected, in an embodiment, to a 100 Base T Ethernet data network (heretofore "Ethernet") 1500. The local area network (LAN) switch 200 allows for each LRU node connected to the Ethernet network to be treated as a single segment, allowing for faster data transfer through the Ethernet network. Multiple LAN switches 200 could be used in another embodiment. The present invention could operate according to any appropriate networking communication standard, such as Ethernet 100 Base T, 10 Base 2, 10 Base 5, 1000 Base T, 1000 Base X, or Gigabit network. In yet another embodiment, the network could instead be an Asynchronous Transfer Mode (ATM), Token Ring, or other form of network.

In accordance with an aspect of the invention, the cabin management terminal 1100 can be used in the configuration checking method as described in connection with FIGS. 1 and 3 and the downloading method described in connection with FIGS. 5-9.

Area Distribution Box

Turning to FIG. 2a, the area distribution box 2150 is generally a local seat-level routing device. The area distribution box 2150 controls the distribution of signals on the network data backbone 1500 and the RF backbone 1600 to a group of the seat electronics boxes 2160 (FIG. 2b). The area distribution box 2150 maintains assigned network addresses of seat electronics boxes 2160 and, optionally, tapping units 2130. The area distribution box 2150 preferably also includes built-in test equipment (BITE) capabilities. Additionally, the area distribution box 2150 controls and communicates with a corresponding zone passenger service system 2155 that includes, for example, overhead reading lights and attendant call indicators.

Optionally, the area distribution box 2150 further operates to control the tapping unit 2130 in a similar way to that described below in connection with the for the audio/video controller 2120.

In an embodiment, the area distribution box 2150 may operate as either the configuration server, the download server, or both. Hence, the area distribution box 2150 may be a server 1200 as shown in FIG. 1, handling either the configuration checking or software downloading functions as will be described in greater detail in connection with FIGS. 3 and 5. It should be recognized, however, that in accordance with another aspect of operation of the invention, the area distribution box 2150 is capable of responding to a configuration check when prompted request from another device. In such an embodiment, the area distribution box acts as a configurable target LRU 1300 as described below in connection with the configuration checking method of FIG. 3 or in connection with the downloading method 5000 of FIG. 5.

The area distribution box 2150 hardware includes one or more microprocessors with a memory, such as a flash memory, a network interface card, an RS485 interface, and radio frequency amplifiers. Additionally, in an embodiment, the area distribution box 2150 contains appropriate gain control circuitry for gain control of the RF distribution. In an embodiment, the software running or stored on the area distribution box 2150 might include multiple software components, such as an operating system (e.g., Linux), a web server (e.g., Apache), TCP/IP, FTP client, FTP server, and ports or connectors for interfacing with the tapping unit(s) and CSS. An appropriate interface includes a serial port, such as RS 485 interface, or a USB.

Audio Video Controller

The audio/video controller 2120 generally operates as an entertainment headend controller and can perform a variety of functions within the IFE system. The audio/video controller 2120 communicates with a plurality of input devices, such as cameras, video players, audio players, etc. The audio/video controller 2120 is in communication with both the data backbone 1500 and the broadcast backbone 1600. The functions of the audio/video controller 2120 include, for example, distributing audio and video content, controlling the tapping units 2130 and overhead display units 2140, and frequency modulation for various inputs such as video tape reproducer 2080 and audio reproducer unit 2090.

Additionally, in an embodiment, the audio/video controller 2120 also operates as a headend controller of the passenger service system 2060 (PSS), which includes, for example, the public address system and warning indicators instructing passengers to fasten seat belts or not to smoke. Accordingly, the audio/video controller 2120 is connected to PSS related inputs such as the cockpit area microphone 2070, which can interrupt other signals over the RF backbone 1600 for crew announcements. By incorporating PSS control functions into the audio/video controller 2120, the need for a separate LRU 1300 for controlling those PSS functions is eliminated.

Furthermore, the audio/video controller 2120 operates the passenger flight information system (PFIS) 2100 as a point of access for system data, including data obtained from non-IFE system equipment, such as aircraft identification, current time, flight mode, flight number, latitude, longitude, and airspeed. To facilitate external communications, according to an embodiment, the audio/video controller 2120 is further in communication with a cabin telecom unit 2050 that can communicate with earth or satellite based communication stations through one or more satellite links 2020.

In accordance with an aspect of the invention, the audio/video controller 2120 can operate as the configurable LRU 1300 described in connection with FIG. 1 and FIG. 3 below. The audio/video controller 2120 can respond to configuration request by generating a configuration file, transmitting the configuration file via FTP, and receiving a download of updated software components. In another embodiment, the audio/video controller 2120 may act as the configuration server, the download server, or both.

The audio/video controller 2120 hardware includes a microprocessor, an Ethernet switch, telephony interface components, an Aeronautical Radio, Inc. (ARINC) interface, an RS485 interface, and audio modulators for the public address and audio/video content distribution. The audio/video controller 2120 contains various software components including, for example, an operating system such as Linux, a web server such as Apache, TCP/IP, FTP client, FTP server, RS485 interfaces to the tapping units and CSS, and LAPD communications.

Digital Server Unit

The digital server unit 2500 provides analog and video outputs derived from digital content stored, for example, a hard disk drive, and is constructed modularly with a well-defined external interface. A rack mount is provided with electrical and physical interfaces as specified in ARINC 600. The digital server unit 2500 obtains power, connects to external control interfaces, provides 6 base-band video outputs with 2 stereo audio outputs associated with each video output and 12 stereo outputs and 1 RF output that combines 3 RF inputs with 6 modulated video signals (including 12 stereo video-audio) and 12 stereo modulated audio outputs at this connector. Auxiliary front mounted connectors are also provided for diagnostic access and expansion of the storage sub-system via a SCSI II interface. FIG. 2c is a block diagram of an embodiment of the digital server unit 2500.

The digital server unit 2500 is modular in construction, comprising a power supply 2530, a connector 2540 (e.g., an ARINC 600 connector), an RF combiner 2590, a BITE component 2610, a connector 2620, a TERM component 2630, LEDs 2640, a serial console 2650, an E-net component 2655, an SCSI component 2670, and an I/O assembly 2605 with the modular ARINC connector and a back-plane that interfaces to modular circuit cards, as understood by one skilled in the art. These circuit cards provide control and interface functions, audio or video decoding, analog buffering, RF modulation, and multiplexing of the audio or video signals into a combined signal. The chassis provides mounting and cooling provisions for the modular circuit cards as well as mounting means for the disk drive 2520. The mounting means for the disk drive 2520 is designed to extend the physical operating parameters, for example, the shock and vibration parameters of the disk drive 2520 for use in an aircraft.

The controller 2510 shown in FIG. 2c includes a central processing unit (CPU), which in the presently preferred embodiment is an 8260 Power PC. The CPU accesses digital content stored in the disk drive 2520 and streams the content via 100 Base T Ethernet interfaces to video or audio clients where the digital data is decoded and converted to analog audio and/or video signals, which are then buffered and made available as differential base-band video and audio output at the ARINC connector for other LRUs 1300 within the network 1000. The signals are also modulated into RF signals and combined with 3 RF input signals for distribution via the broadcast RF audio/video backbone 1500.

The I/O assembly shown in FIG. 2c includes: a primary domain full duplex 100 Base T Ethernet port; four secondary domain full duplex 100 Base T Ethernet ports; 2 RS-232 communication ports; 2 master or slave capable ARINC 485 communication ports; 12 master capable ARINC 485 communication ports; one CEPT E-1 digital telephone trunk-line; one four-wire modem with a differential 20 ohm, 0 dBM audio output and a 600 ohm, 0 dBM audio input; 17 ARINC 720 compliant keyline inputs; 11 ARINC 720 compliant keyline outputs; one standby input keyline; one 20 ohm, 0 dBM auxiliary audio output; one 20 ohm, 0 dBM PRAM audio output; one 20 ohm, 0 dBM BGM audio output; 9 discrete inputs to identify unit address and RF frequency blocks; six differential 100 ohm, 1 Vpp video outputs; 12 differential 20 ohm, 0 dBM stereo audio/video outputs; 12 differential 20 ohm, 0 dBM stereo audio outputs; one passively coupled combined RF input; two actively amplified and combine RF inputs; one RF output combining the three RF inputs with all internally RF modulated audio/video signals; and single phase, 115 VAC, 400 Hz power input.

The front panel of the digital server unit 2500 further includes one secondary domain full duplex 100 Base T Ethernet port; one RS-232 communication port; DC power supply voltages; one supervisory processor reset; one supervisory processor attention input; LED status indicators for AC OK, DC OK, BITE OK, SCSI activity; one SCSI expansion port; one Ethernet switch status interface; and one test mode keyline input. The connection of the digital server unit 2500 within the network 1000 may vary considerably. An embodiment is shown in FIGS. 2a and 2b.

The digital server unit 2500 provides video entertainment in a way similar to a videotape reproducer 2080 or audio tape reproducer 2090. Instead of videotape, video content is stored in compressed format, compliant with the Motion Picture Expert Group (MPEG) format (MPEG-1 or MPEG-2). The video data is stored in multiplexed format including video and between one and sixteen audio tracks in the MPEG-2 transport stream format. The audio content is stored, instead of with audio tape, on a hard disk 2520 in compressed format, compliant with the MPEG-3 (MP3) format. The high performance disk drive 2520 is accessed via a wide and fast SCSI interface by the CPU on the controller 2510. The digital content is then streamed via TCP/IP to client platforms 2550, 2560, 2570, and 2580 on circuit cards within the digital server unit 2500.

Two types of clients are implemented: video clients (two per circuit card), and audio clients (four per card). Each video client can generate one video output with two associated simultaneous stereo language tracks selected from up to sixteen language tracks multiplexed with the video. Each audio client can generate 3 or 4 audio outputs. The digital server unit 2500 contains three video client cards for a total of six video clients and six associated dual stereo video and audio/video outputs. Twelve of the audio outputs are general purpose in nature, while the 13th and 14th outputs are used to implement PRAM and BGM functions. As these two aircraft interfaces are generally monaural, MP3 programming for the 13th and 14th audio outputs is encoded and stored as monaural MP3, and only the left channel of the stereo decoder is connected to the appropriate aircraft public address system input.

The video clients are not only digital MPEG audio/video decoders, but are also general purpose PC compatible platforms, and may implement customized functions that are displayed as broadcast video channels through the broadcast backbone 1600. A typical example of this use of a video client is the implementation of a Passenger Flight Information System (PFIS) 2100.

The controller 2510 includes, according to an embodiment of the present invention, a Power PC processor running at 166 MHz; 4 megabytes (MB) of boot Flash ROM memory; 64 MB of application Flash ROM memory; 64 MB of disk on chip Flash ROM memory; 256 MB of RAM memory; 2 kB of non-volatile static RAM; a clock calendar powered by a super capacitor; a high performance SCSI controller; two 9-port 100 Base T Ethernet switches; a digital signal processor (DSP) sub-system operating at 320 MIPS with 320 kB of internal memory and 1 MB each of external Flash and RAM memory, used to provide voice over IP, echo cancellation, DTMF tone generation and decoding, and legacy modem support; and one temperature monitor positioned at the upper wedge-lock, with two additional sense points at the lower wedge-lock and the CPU.

In a preferred embodiment of the present invention, the digital server unit 2500 may act as the configuration server, the download server, or both. The digital server unit 2500, as described in the foregoing, has the computing resources necessary to carry out both the configuration method and the download method of the present invention. In an embodiment of the present invention, there may be more than one digital server unit 2500 installed within the network 1000, allowing for a higher volume of data to be communicated to other LRUs 1300 within the network 1000.

In accordance with an aspect of the invention, the digital server unit 2500 is capable of responding to a configuration check request and to receive a software download in connection with the method described below in connection with FIGS. 3 and 5. In such an embodiment, the digital server unit 2500 is the target LRU 1300 in the configuration checking method 3000 described below in connection with FIG. 3 and the downloading method described below in connection with FIG. 5.

Satellite Link

To communicate outside of the aircraft, the IFE system 1000 includes an optional satellite link 2020 in FIG. 2a, which provides additional sources of audio, video, voice, and data content to the IFE system. In connection with a multichannel receiver module 2030, it provides a plurality of video channels to the IFE system. In an embodiment, the multichannel receiver module 2030 is connected to the RF backbone 1600 that connects to other LRUs 1300 within the IFE system. The satellite link 2020 may also provide Internet access in combination with a network storage unit 2040, wherein a plurality of popular web pages are downloaded to the network storage unit 2040 while the aircraft is on the ground, when the satellite link bandwidth is not consumed with bandwidth intensive graphics or movies. In cooperation with the cabin telecommunications unit 2050, the satellite link 2020 may also provide access to ground based telephone networks, such as the North American Telephone System (NATS).

Tapping Unit

Generally, the tapping unit 2130 is an addressable device for tapping the broadcast signal and distributing selectable or predetermined portions of the signal to one or more display units. Accordingly, the tapping unit 2130 is connected directly to one or more overhead display units 2140 mounted for viewing by a single passenger or by a group of passengers. The overhead display unit 2140 may be mounted, for example, to a bulkhead or ceiling in an overhead position, in the back of a seat in front of a viewer, an adjustable mounting structure, or in any appropriate location. In an embodiment, the IFE system 1000 includes multiple tapping units 2130. The tapping unit functions to turn the display unit on or off, and to tune the tuner for audio or video channel selection. In an embodiment, the tapping unit 2130 is also used to report the status of the radio RF signal on the audio/video RF backbone 1600.

In accordance with an aspect of the invention, the tapping unit 2130 is capable of responding to a configuration check request and to receive a software download in connection with the method described below in connection with FIGS. 3 and 5. The LRUs 1300 of FIG. 1 may be the tapping unit 2130.

Seat Electronics Box

FIG. 2b is a continuation of the block diagram of FIG. 2a, a plurality of seat electronics boxes 2160 are connected to the area distribution box 2150 through the network data backbone 1500. Each of the seat electronics boxes 2160 provides an interface with individual passenger control units 2220, personal digital gateways 2230, video display units 2170, or smart video display units 2175 available to the respective passengers on the aircraft. In another embodiment (not shown in FIG. 2b), more than one video display unit 2170 or passenger control unit 2220 are connected to each seat electronics box 2160. The seat electronics boxes 2160 also control the power to video display units 2170, the audio and video channel selection, and volume. One or more universal serial buses 2180 or audio jacks 2200 are also connected to the seat electronics boxes 2160, allowing a passenger to connect a laptop computer 2190 or headphones 2210 into the network 1000. In an embodiment, hardware on a seat electronics box 2160 includes a microprocessor, RF tap, RF amplifier, RF level detection, RF gain control, and RF splitter, an FM tuner, and a digital signal processor (DSP) for handling voice over IP.

In view of the foregoing description of the hardware architecture of the network 1000, described now will be steps of how the system 1000 is capable of performing a configuration checking method and downloading method by which LRU configurations can be checked, maintained, and repaired or updated.

Configuration Checking Method

Steps of a configuration checking method 3000 according to an embodiment of the present invention are illustrated in FIGS. 3a-d. Generally, the configuration checking method 3000 is performed by the system 1000 of FIG. 2a-c to determine the software configuration or hardware configuration of each of the LRUs 1300. It should be understood that "LRUn" as referred to herein could be any one of the target LRU computers 1300, such as the audio/video controller 2120, area distribution box 2150, seat electronics box 2160, etc. or any of the components described herein as being a configurable LRU 1300. Although the configuration checking method 3000 can be performed to produce various results as needed for a particular application, the configuration checking method 3000 produces a system configuration data file (SCDF), as will be described in greater detail below, shows the configuration of each checked LRU 1300 and optionally an event log which shows inconsistencies or changes in the configuration of each LRU 1300 relative to previous or desired configurations.

The method 3000 can be started either manually or automatically. For example, at step 3010, the method 3000 is manually initiated when a user enters an initiation command from the management terminal 1100 (FIGS. 1, 2a) or alternatively from another device, such as a laptop 2190, within in the system 1000. The method 3000 may also be initiated automatically, as indicated at step 3040, upon startup of the LRUn 1300, for example, upon actuation by a switch on the LRUn, upon connection of the LRUn to a power supply, upon connection of the LRUn to a network, or upon rebooting of the LRUn or another component of the system 1000. In either case, the configuration server hosts a URL which initiates the configuration check. With reference to FIG. 2a, the configuration server can be any component that is equipped with appropriate software and which is in communication with the data backbone 1500. Preferably, the configuration server is the digital server unit 2500 or the area distribution box 2150.

Furthermore, the server 1200 shown in FIG. 1 might be either the configuration server or the download server. The layout of the system, as shown in FIG. 1, applies to both the method for configuring and the method for downloading software components on the LRUs 1300 within the system 1000. The server 1200, therefore, should be understood to represent either the configuration server or the download server; the server 1200 is capable of carrying out both functions either sequentially or in parallel, as described herein in relation to the methods of configuration and download. In another embodiment of the present invention (not shown in FIG. 1), there may be more than one server 1200. In such an embodiment, the LRUs 1300 within the system would be able to communicate through the network 1500 with more than one server 1200.

In some cases when a user manually initiates the method 3000, the user may want to review results from a previous configuration check, and accordingly, step 3015 provides an opportunity for choosing to review a previous configuration condition. If the previous results are to be viewed, step 3020 obtains a SCDF that was the result of a previous configuration check, and the results are displayed in step 3025. An appropriate error message might be displayed in step 3025 if no previous results are available to the configuration server in step 3020.

In the step 3020 of obtaining the SCDF for viewing in an embodiment wherein the SCDF is stored at the configuration server, the management terminal 1100 opens an FTP session with the configuration server and executes an FTP "get" command. In response, the SCDF is read from storage at the configuration server and transmitted back to the management terminal 1100 for displaying through a monitor or printing at step 3025 through a peripheral device, such as a printer. In an embodiment wherein the SCDF is stored at the management terminal, the SCDF could be read from the storage device at the management terminal.

Steps 3020 and 3025 are useful to access past configuration information in an expeditious manner. Past configuration information could be useful in a system wherein the LRU 1300 configurations do not often change. Time is saved by permitting a user to refer to older configuration data prior to, or instead of, performing a checking method that would likely return redundant information.

Where a user has initiated the checking method 3000 in real time at step 3010, certain troubleshooting or updating applications may present a situation in which it is desirable to check the current configurations of some of the LRUs 1300, but not all. Therefore, step 3030 provides an opportunity for user selection of one or more LRUs 1300 to be checked. According to an embodiment of the present invention the management terminal displays a menu of various LRU selections including, for example, individual units, groups of units, or all of the configurable units within the system. The configuration server then sends a configuration request to each selected LRU 1300 at step 3035. For descriptive purposes, we will assume that a user of the system 1000 has selected only LRUn 1300 in step 3030.

According to an embodiment of the present invention, the configuration requests sent to the selected LRUs at step 3035 are preferably in the form of an Ethernet broadcast (e.g., in the case of a single target LRU) or multicast (e.g., in the case of multiple target LRUs) using a standard protocol such as TCP or UDP appropriately addressed to each of the selected LRU 1300 destinations. In the presently preferred embodiment of the invention, UDP is used since the messages sent within the system 1000 are short, and may be resent if an error is detected. The error correction available for use with TCP is not needed for this reason. The configuration server maintains a configuration map that identifies the LRUs 1300 present, the corresponding IP addresses and the assigned seat numbers. Each of the configuration requests is generally an instruction for the LRUn 1300 to generate a configuration file CFn, which will be described in greater detail below in connection with Table 1.

Figure 3A:
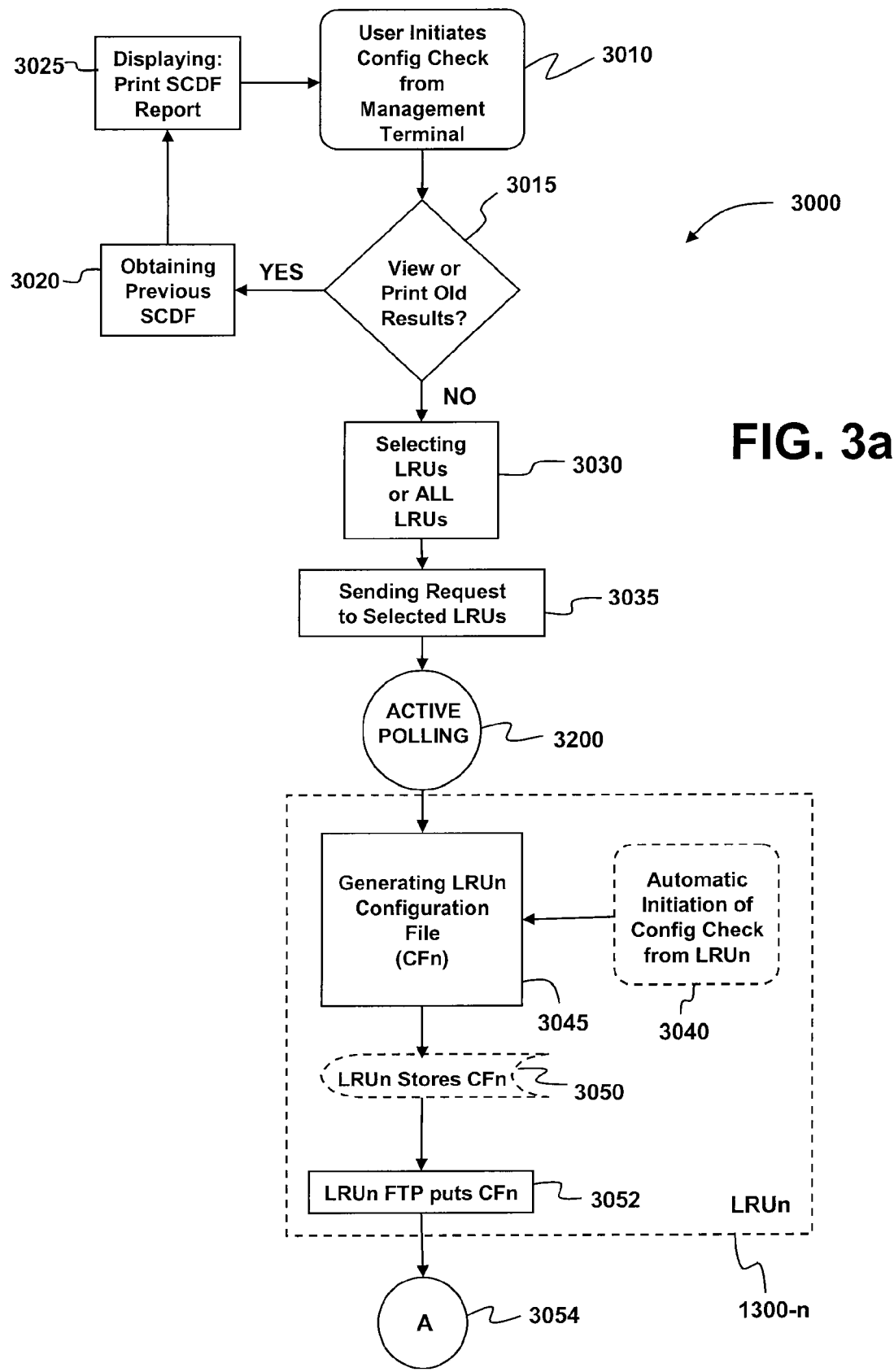
FIG. 3a is a first portion of a flow chart of a method for checking the configuration of computers within a restricted architecture network according to teachings of the present invention.

The computer executable code operable to perform steps 3010-3035 is run at the management terminal 1100, in an embodiment. The software necessary for performing the functions associated with steps 3010-3035 may be stored at the management terminal as well. Alternatively, the steps 3010-3035 can be performed at the configuration server 1200. In an embodiment, the set of steps 3045-3052 are performed by software loaded on the LRUn 1300, as shown in FIG. 3a.

After sending a request for a configuration file to the selected LRUs 1300, there is an optional set of steps for active polling of the LRUs 1300. The active polling steps are shown in FIG. 3d; the steps of active polling begin after step 3035 in FIG. 3a, and continue with step 3045 in FIG. 3a after control is returned in step 3230 of FIG. 3d.

Figure 3B:
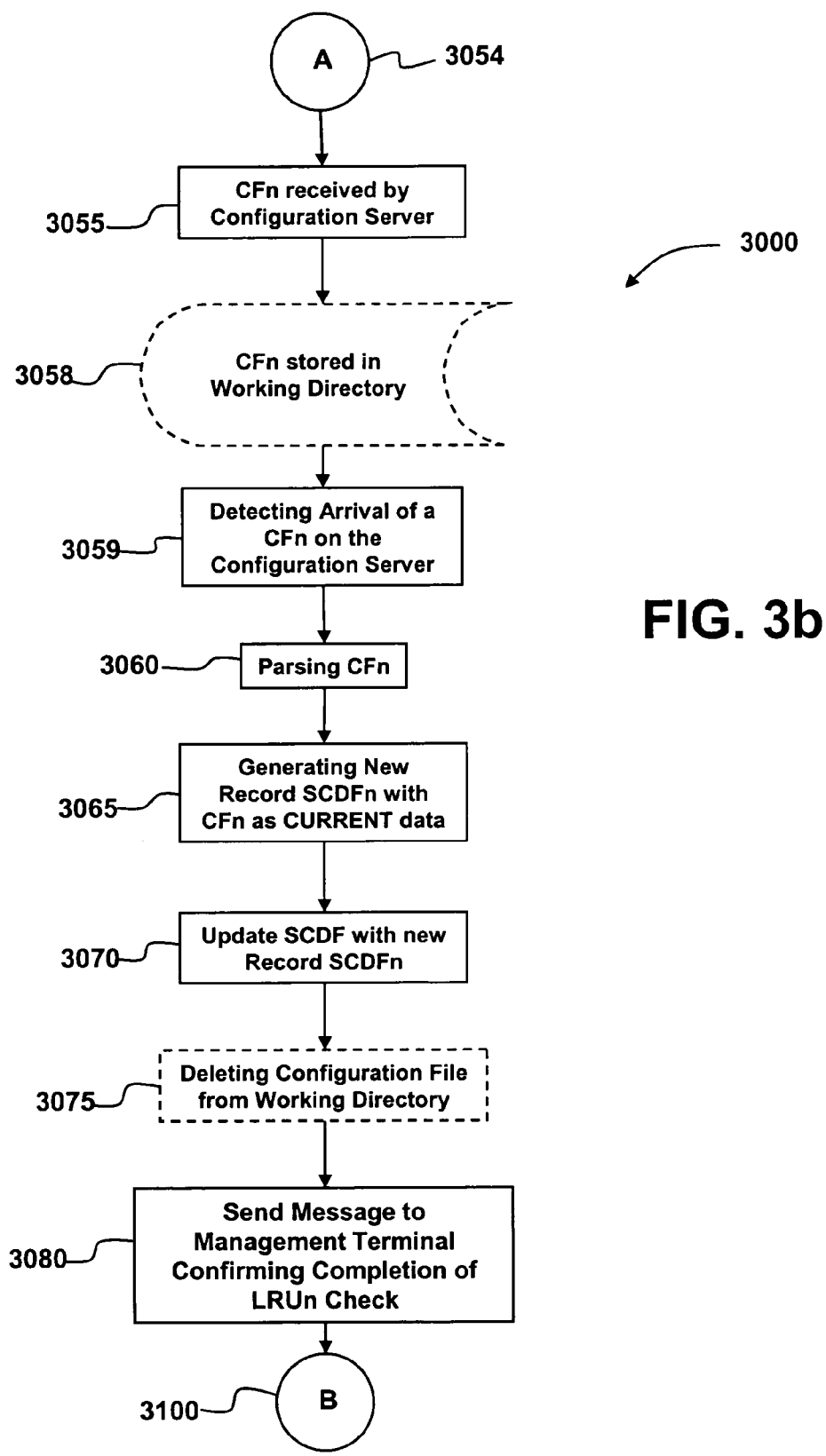
FIG. 3b is a second portion of a flow chart of the method for checking the configuration of computers within a restricted architecture network according to teachings of the present invention.
Figure 3C:
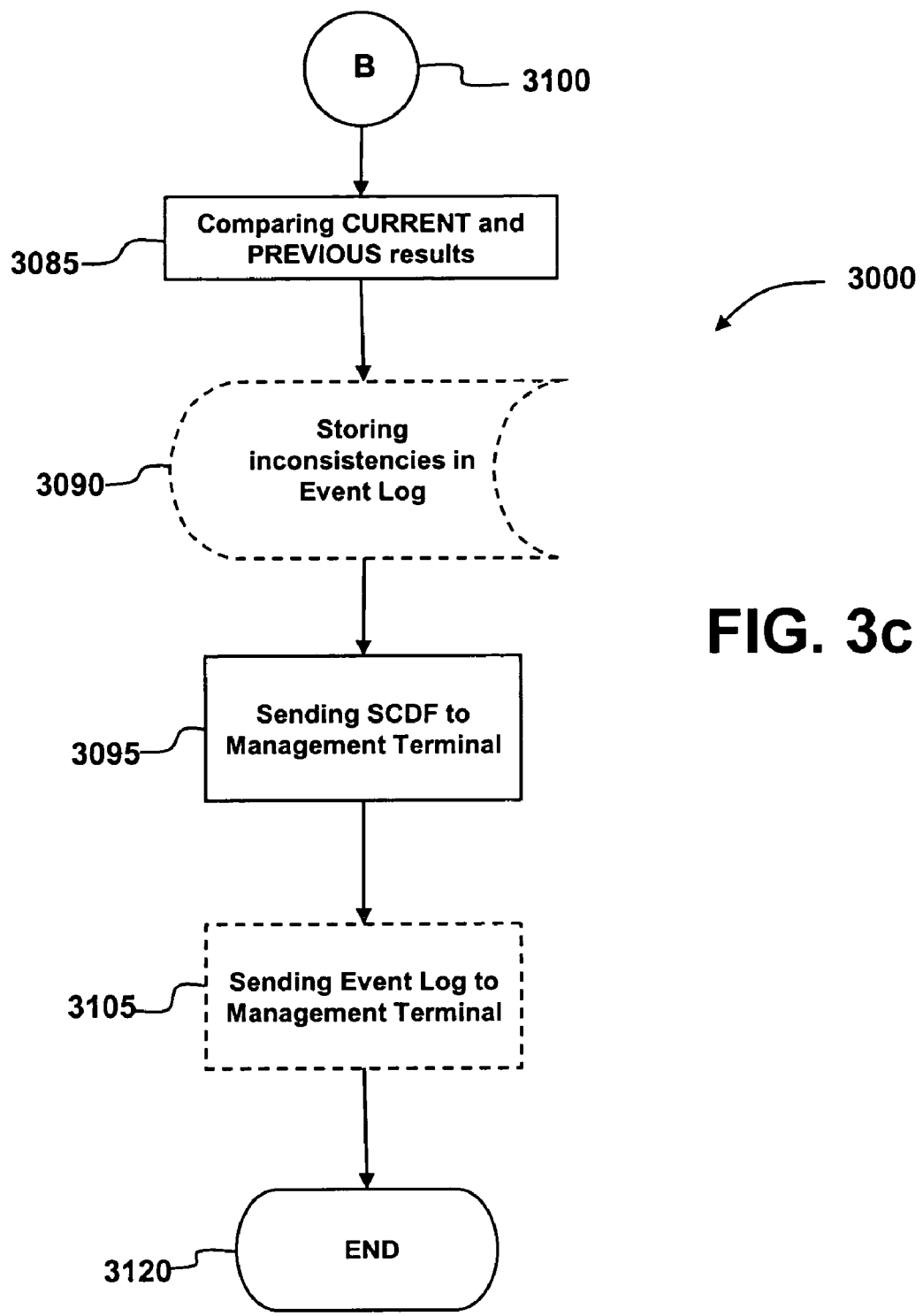
FIG. 3c is a third portion of a flow chart of the method for checking the configuration of computers within a restricted architecture network according to teachings of the present invention.
Figure 3D:
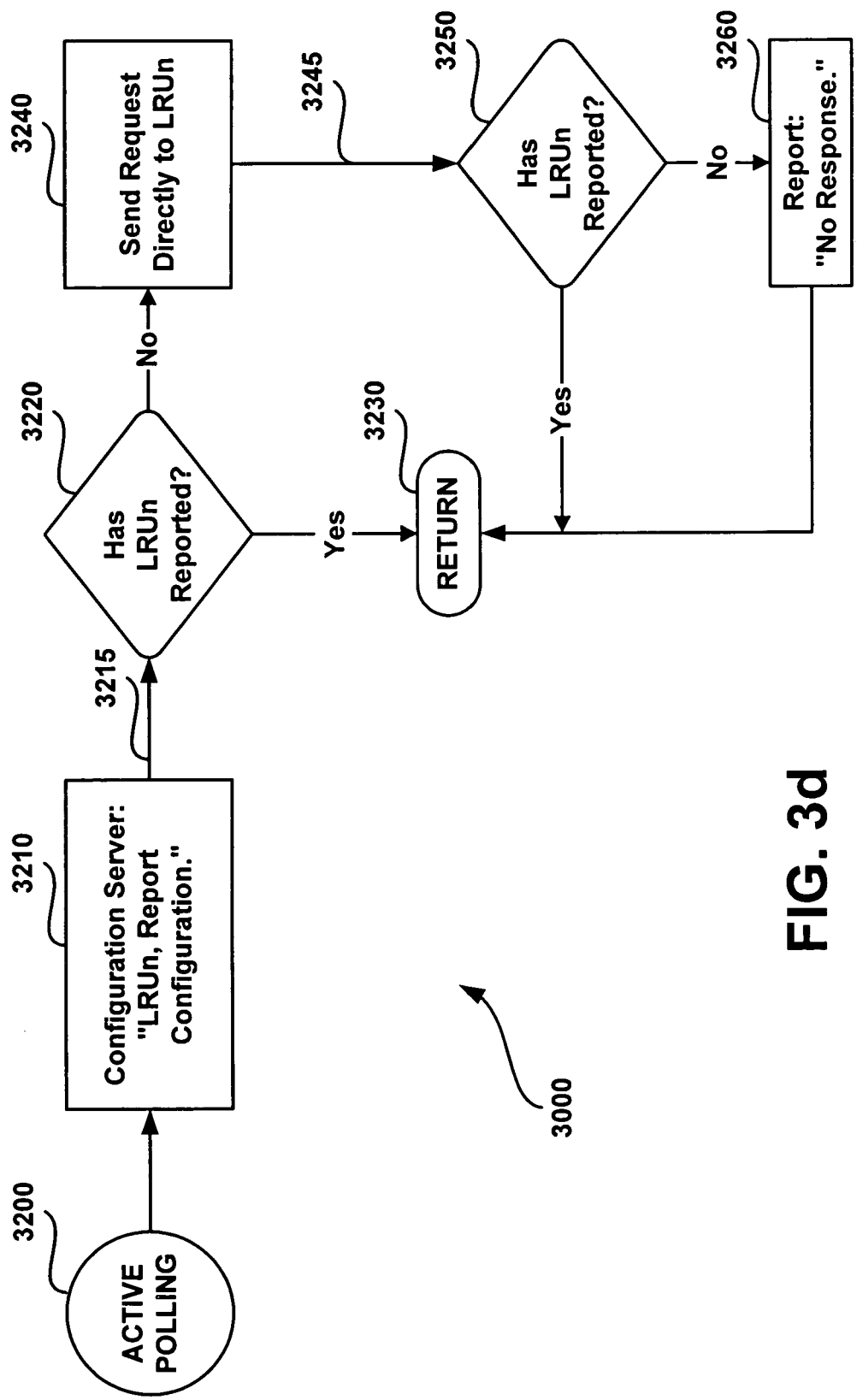
FIG. 3d is a fourth portion of a flow chart of the method for checking the configuration of computers within a restricted architecture network, showing the active polling steps of the method according to teachings of the present invention.

In an embodiment, the active polling method of FIG. 3d is carried out by an Java Applet running inside a Web page on the LRUn 1300 (or on any of the LRUs 1300). With the Applet running on the LRUn, the configuration server is capable of executing instructions in order to carry out the method shown in FIG. 3d. The configuration server listens on a particular socket, and increments for every new configuration file received. A progress bar indicates how many of the LRUs 1300 have reported. According to an embodiment of the present invention, the entire method of FIGS. 3a-d might take less than a few minutes—much faster than any previously known method for configuring software within a restricted architecture network.

In the first step of active polling, step 3210, the configuration server sends an initial instruction to the LRUs 1300 selected in step 3030, such as LRUn, to perform the generating step. The configuration server then waits a first predetermined period, indicated by the arrow 3215 in FIG. 3d. A check is made, in step 3220, of whether the configuration file (CFn) for LRUn has been received by the configuration server during the first predetermined period of time. If so, then the configuration method returns in step 3230 to the next set of steps shown in FIG. 3a, beginning with step 3045. If not, then a second instruction is sent in step 3240 from the configuration server to the LRUn to perform the generating step. Step 3240 is performed by sending the request directly from the configuration server to the particular LRUn that has not reported before step 3220 (rather than a broadcast to all the LRUs 1300 selected in step 3030). After waiting a second predetermined period, which is indicated by the arrow labeled 3245 in FIG. 3d, the active polling method continues by again checking in step 3250 whether the LRU configuration file has been received. If the selected LRU has still not reported after step 3250, then a "No Response" report is generated in step 3260, and the method returns in step 3230 to the next set of steps shown in FIG. 3a, beginning with step 3045. The steps 3200-3260 together comprise the method for active polling that is carried out as part of the method for configuring LRUs (e.g., designated here as 1300-n) within the system 1000 of the present invention.

Turning back to FIG. 3a, it is clear from the flow chart that whether the method 3000 has been initiated manually (steps 3010-3035) or automatically (step 3040), each selected or predetermined LRU 1300 respectively generates an associated current configuration file CFn at step 3045. The configuration file CFn includes current software or hardware configuration information about the particular LRUn, e.g., unit identification, hardware parts numbers, serial numbers, Media Access Control (MAC) addresses, IP addresses, and software component parts numbers, or any other information concerning LRUn that is desirably tracked. When the configuration file CFn for the LRUn is generated, it is optionally stored on a storage device at the LRUn as indicated by step 3050 in FIG. 2. An exemplary configuration file CFn of LRUn is shown below in Table 1.

TABLE 1

| Configuration File (CFn) of LRUn | |
|---|---|
| 65938 | Computer Part Number |
| 51759 | Serial Number |
| 12345 | Software Component 1 |
| 23456 | Software Component 2 |
| 34567 | Software Component 3 |

When the configuration checking method 3000 has been started automatically at step 3040, the LRUn automatically generates the configuration file CFn. As will be apparent to those of skill in the art, this can be accomplished in various ways, such as with appropriate instructions programmed into startup operations of an operating system at the LRU 1300.

Each LRU then sends its configuration file to the configuration server at step 3050. Preferably, the configuration checking method 3000 uses a standard protocol such as FTP for sending files over the restricted architecture network. FTP is a commonly known application that is commonly bundled with TCP/IP (also called the Internet Protocol Suite). Accordingly, to send the configuration file, LRUn opens an FTP session with the configuration server and executes an FTP "put" command to transmit the configuration file CFn from LRUn to the configuration server, as indicated by step 3052.

The LRU operations of respectively generating associated configuration files CFn (step 3045) and sending the files to the configuration server (step 3050) can be executed in parallel among the plurality of LRUs 1300 within the system 1000. This parallel configuration checking method is advantageous for its efficiency. FIG. 3*a* is connected to FIG. 3*b* with the circle labeled "A" 3054, which is shown in both figures. When the configuration server has received the configuration file CFn at step 3055, the configuration server may hold the configuration file CFn in a working directory in step 3058. As is known to those of skill in the art, it is not necessary for the configuration file to be held in a working directory, and the configuration method could be carried out on the fly without storing the information kept in the configuration file, but it is advantageous in that the information may be reused if it is kept in a working directory in step 3058.

Figure 4A:
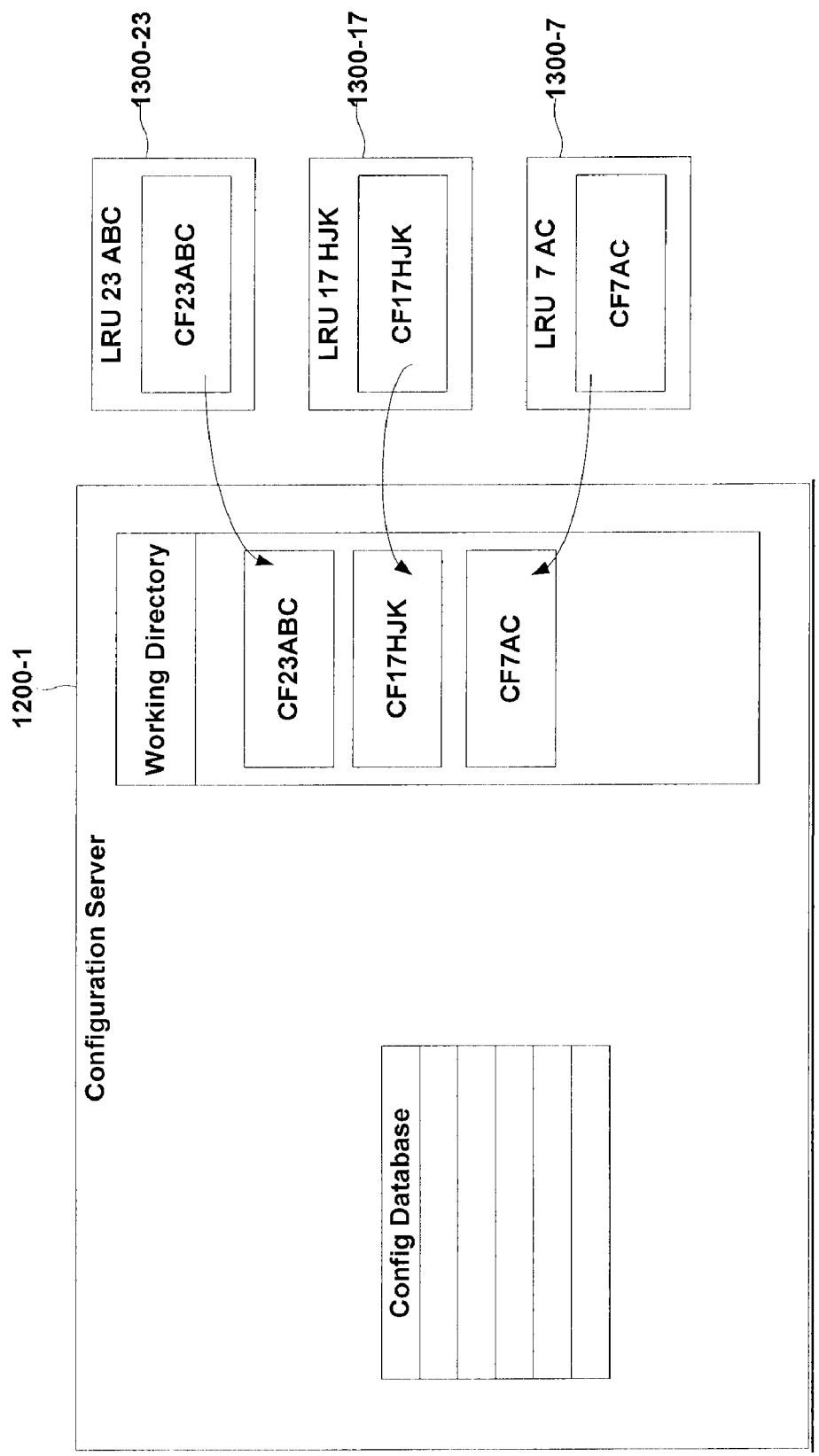
FIG. 4a is a schematic diagram of a target LRUs sending configuration files to the configuration server.
Figure 4B:
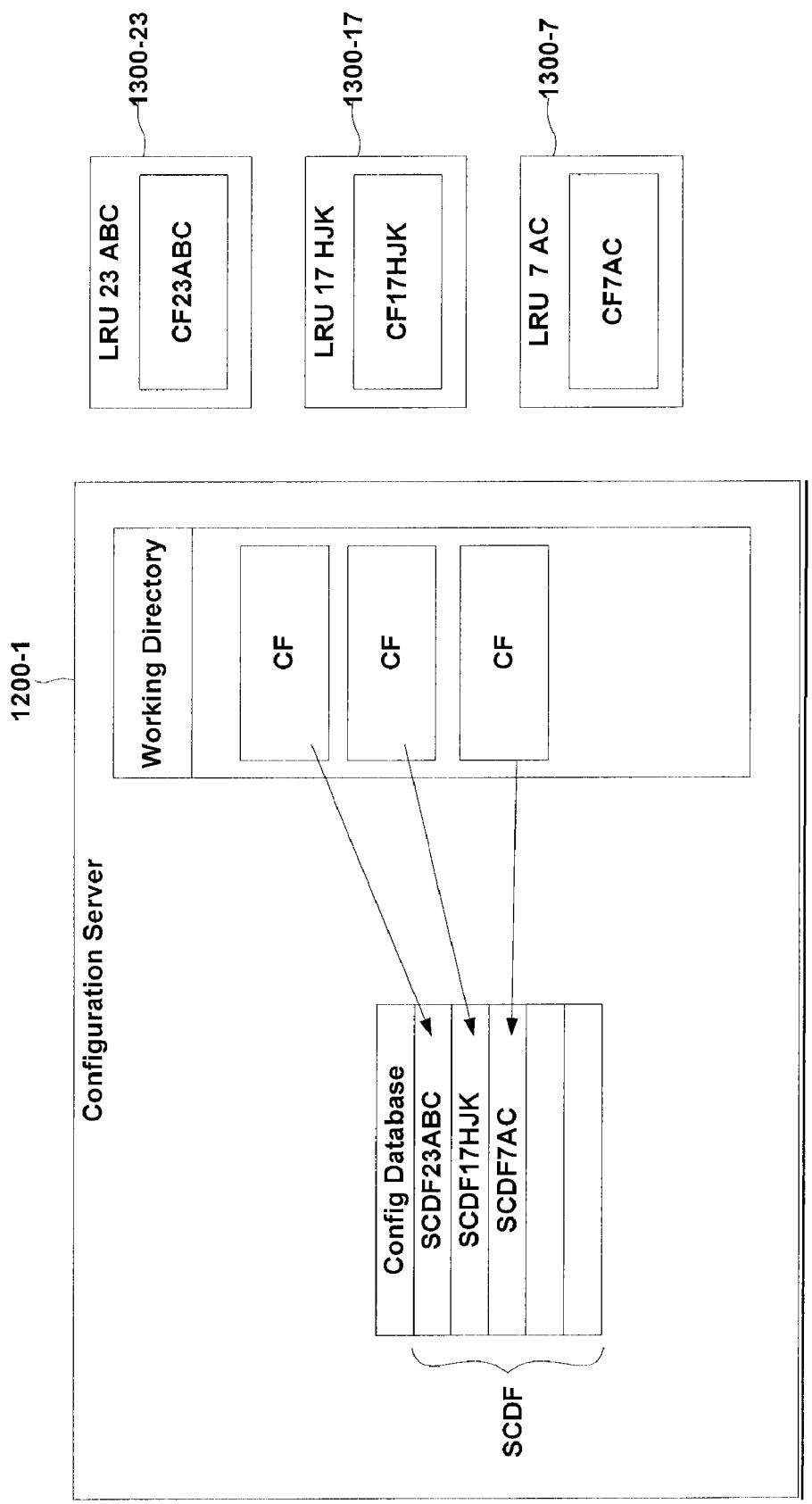
FIG. 4b is a schematic diagram of the configuration server storing configuration files to the SCDF in a configuration database.

FIG. 4*a* schematically illustrates the sending of configuration files from LRUs which serve seats 23 AB and C, seats 17 HJ and K and seats 7 A and C, respectively, and are thus designated as LRUs 1300-23, 1300-17 and 1300-7, respectively in this figure as well as in FIGS. 4*b*, 6*a* and 6*c* (only LRUs 1300-23 and 1300-17 are shown in FIG. 6*c*). The LRUs independently generate and execute an FTP "put" to send their corresponding configuration files CF23ABC, CF17HJK and CF7AC to the configuration server, where the configuration files are placed in the working directory.

The configuration server continuously or periodically checks the working directory for a new configuration file. Referring back to the method 3000 as illustrated in FIG. 3*a*, when the configuration server detects the arrival of a new configuration file CFn in step 3059, the configuration server then updates in step 3060 a portion of the SCDF with the data of the configuration file CFn. Step 3060 generally comprises a parsing operation, which allows a portion of CFn to be extracted and supplied to the SCDF in steps 3065 and 3070. More specifically, configuration file CFn associated a particular LRUn is then generated (step 3065) into a portion of the SCDF referred to herein as a "record" indicated as element SCDFn. If a record SCDFn already exists, then the record is updated with the information parsed from the CFn in step 3070.

Each of the individual records SCDFn comprises a comparison table that contains, for example, "CURRENT," "PREVIOUS" and "DESIRED" sets of data. For a given record SCDFn, each of the "CURRENT," "PREVIOUS" and "DESIRED" sets contains data representing the categories contained in a configuration file for LRUn, as described above. An exemplary SCDFn record is shown in Table 2 as follows:

In the exemplary SCDFn of Table 2, the CURRENT configuration reveals, for example, a new computer that has part number, serial number, and software component numbers matching the DESIRED configuration. The column labeled "DESIRED" reflects a configuration which, in an embodiment, a user has designated as the desired configuration for a particular LRUn. The data in the DESIRED column is updated upon the selection by a user of desired software components from a software inventory in connection with a downloading method as will be described in greater detail below in connection with FIG. 5. The column labeled "DESIRED" can contain all, some or none of the configuration information that appears in the columns labeled "CURRENT" or "PREVIOUS", depending upon what hardware or software a user of the system desires to keep uniform throughout the system. During the configuration checking method 3000, the PREVIOUS data is replaced with the old CURRENT data, and the CURRENT column of the SCDFn record (Table 2) is updated by overwriting the CURRENT data with parsed CFn data (Table 1).

Each of the records SCDFn is a portion of an SCDF which contains records for all of the LRUs 1300. The SCDF preferably contains a complete representation of the desired software or hardware configuration information of the system 1000, and accordingly, the SCDF includes a plurality of records SCDFn respectively corresponding to the plurality of configurable LRUn 1300 of the system 1000. The SCDF is updated with the new record SCDFn, and the updated SCDF is written to a storage device (e.g., a disc drive, an NVRAM, etc) at the configuration server. The SCDF is preferably restored to RAM of the configuration server upon startup. In an embodiment, all or part of the SCDF may be stored on any of the LRUs 1300 within the system. As is known to those of skill in the art, all that is required for the SCDF to be stored on a particular LRU 1300 is an available memory. The added data integrity provided by the redundancy of this embodiment is advantageous. Optionally, the CFn may be deleted from the working directory on the configuration server in step 3075 after the SCDF has been updated. After LRUn has reported, and SCDFn has been updated within the SCDF, the configuration server sends a message to the management terminal 1100 in step 3080, confirming that LRUn has reported its configuration.

As illustrated schematically in FIG. 4*b*, the exemplary configuration files CF23ABC, CF17HJK and CF7AC are generated into corresponding records SCDF23ABC, SCDF17HJK and SCDF7AC, which are stored to thereby update the SCDF in the configuration database.

The circle labeled "B" 3100 connects the sequence of steps shown in FIG. 3*b* to the next set of steps in FIG. 3*c*. Referring to FIG. 3*b*, the comparing step 3085 is performed to determine changes that have occurred in the respective configurations of the LRUs. In particular, the comparing step compares the CURRENT and PREVIOUS components to determine which of these do not match. Differences between the CUR-

TABLE 2

| CURRENT | | PREVIOUS | | DESIRED | |
|---|---|---|---|---|---|
| 65938 | Computer Part Number | 94740 | Computer Part Number | 65938 | Computer Part Number |
| 51759 | Serial Number | 59811 | Serial Number | 51759 | Serial Number |
| 12345 | Software Component 1 | 12345 | Software Component 1 | 12345 | Software Component 1 |
| 23456 | Software Component 2 | 34567 | Software Component 3 | 23456 | Software Component 2 |
| 34567 | Software Component 3 | — | — | 34567 | Software Component 3 |

RENT and PREVIOUS configurations are optionally written in step 3090 to an event log that contains a history of changes to the configuration of software or hardware within the system 1000. The event log is stored at a storage device at the configuration server or on another computer within the system, such as a management terminal 1100. That is, as indicated in step 3095, the SCDF is sent to the management terminal, and an event log is sent to the management terminal in step 3105. The process then ends at step 3120.

According to an aspect of the invention, the configuration information relating to the various LRUs 1300 is centrally shared and accessible, as compared to some conventional systems in which the configuration data of multiple LRU units was available by laborious testing of each slave computer.

After the parsing step 3060 is complete and the SCDF has been updated with each of the records SCDFn (e.g., Table 2) in steps 3065 and 3070, the configuration file can be deleted from the working directory at the configuration server in step 3075, as schematically illustrated in FIG. 4b. Additionally, the configuration server then notifies in step the management terminal 1100 that the configuration check has been completed for the particular LRUn. In an embodiment, the management terminal 1100 waits until all DESIRED LRUs 1300 have been checked before the management terminal displays the new configuration information.

Advantageously, efficiency and stability of the system 1000 is promoted by facilitating the checking of LRU 1300 configurations per individual LRU unit or by LRU groups. In troubleshooting a problem in the system 1000, maintenance personnel can "zero in" on the problem, for example, by: (a) checking the configurations of all LRUs in the system; and (b) if problems become apparent, then checking LRU configurations individually or by group. LRU groups in which the LRUs 1300 all have the DESIRED configuration may be checked quickly. LRU groups that show differences can then be analyzed one unit at a time. By facilitating this approach to troubleshooting, system maintenance can be performed in a logical, systematic manner that is time efficient. The method 3000 advantageously avoids a need to serially check the entire system one LRU 1300 at a time, thereby avoiding errors and repetitive procedures that have plagued conventional systems.

Method for Downloading

After the configuration checking method has been performed to identify outdated, problematic or otherwise undesired software components, it is desirable to be able to update the LRU 1300 configurations by downloading software components or settings to LRU 1300 units in a pinpoint, as-needed manner. Therefore, according to another aspect of the invention, a downloading method is provided to update respective software components or settings of the LRUs 1300. An exemplary downloading method 5000 is illustrated in FIG. 5. The downloading method is typically used in conjunction with the configuration checking method in order to configure LRUs 1300 with updated software in an efficient manner.

The downloading method is effective to modify LRU 1300 software components so that each LRU has a CURRENT configuration file that matches the DESIRED configuration specified in the SCDFn. The downloading method can be used for updating software components of each LRUn after the configuration checking method 3000 to eliminate discrepancies between the respective CURRENT and DESIRED sets of configuration data for each of the LRUn units. When the configuration checking method 3000 is repeated immediately after the downloading method, the respective CURRENT and DESIRED sets of configuration information will match for each individual LRU, absent some intervening event that has caused an LRU configuration to change.

With reference to FIG. 1, the downloading method generally operates to transmit software components from a software component inventory at the management terminal 1100 or from the server 1200 (which for the downloading method is a download server) to one, some or all LRUs 1300, such as LRUn. Preferably, the downloading is targeted to specific LRU addresses via FTP in order to avoid needless consumption of network resources.

More particularly, turning back to FIG. 5, the software downloading method 5000 begins at an initiating step 5005 when a user, such as IFES maintenance personnel, inputs an instruction to begin the downloading method. In an embodiment, the initiating step 5005 is performed from management terminal 1100 or from an auxiliary maintenance computer, such as a laptop 2190, adapted to interface with Ethernet data backbone 1500 (FIG. 2a) of the system 1000.

In order for the download server to be able to distribute software components needed by the LRUs 1300, those software components must first be placed in a software inventory that resides in a storage device accessible by the download server. In the case of the example herein, the inventory contains the DESIRED software components that need to be stored at the LRUs, as discussed above in connection with Table 2. Accordingly, as illustrated in FIG. 5, the user is prompted at step 5010 to update the configuration server inventory. If so selected, the list of DESIRED software components (that constitute a software "inventory") may be specified in step 5020. Optionally, if the most recent SCDF is available, it may be displayed in step 5015 preceding step 5020. According to an embodiment of the present invention, the menu may be an HTML page displayed on an HTML browser running on the management terminal 1100 or on the auxiliary maintenance laptop. The HTML might even be displayed on one of the passenger control units 2220 or personal digital gateways 2230 connected to the system 1000 (shown in FIG. 2b).

In step 5020, the user can select new software to become part of the DESIRED inventory. The new software components are available by loading in step 5025 from a storage medium readable by at least one component of the system 1000 (FIGS. 1 and 2). For example, the available new software components may be initially provided on a CD-ROM, DVD, or a recordable medium such as a diskette or hard drive that can be read from the management terminal 1100, from the download server, or from any device on the data backbone 1500, as illustrated in FIG. 2a. The new software components can include, for example, entertainment files such as digitally stored movies, music, or system operational files, such as program objects, or graphics. Referring to the method 5000 of FIG. 5, at step 5025, the selected new components are read from the storage device. An FTP "put" command is preferably used to transmit the selected components from the initial storage location to the download server. Alternatively, the selected components remain available for reading from a drive accessible from the download server.

The download server may optionally store locally the new software components in an inventory of DESIRED components in step 5030. This step allows for more flexible distribution of the software components in the second set of steps (5055-5085) in the method for download. In the final step of the first set of steps, the display is refreshed in step 5040 to reflect the inventory as updated to contain the new DESIRED components.

Figure 5:
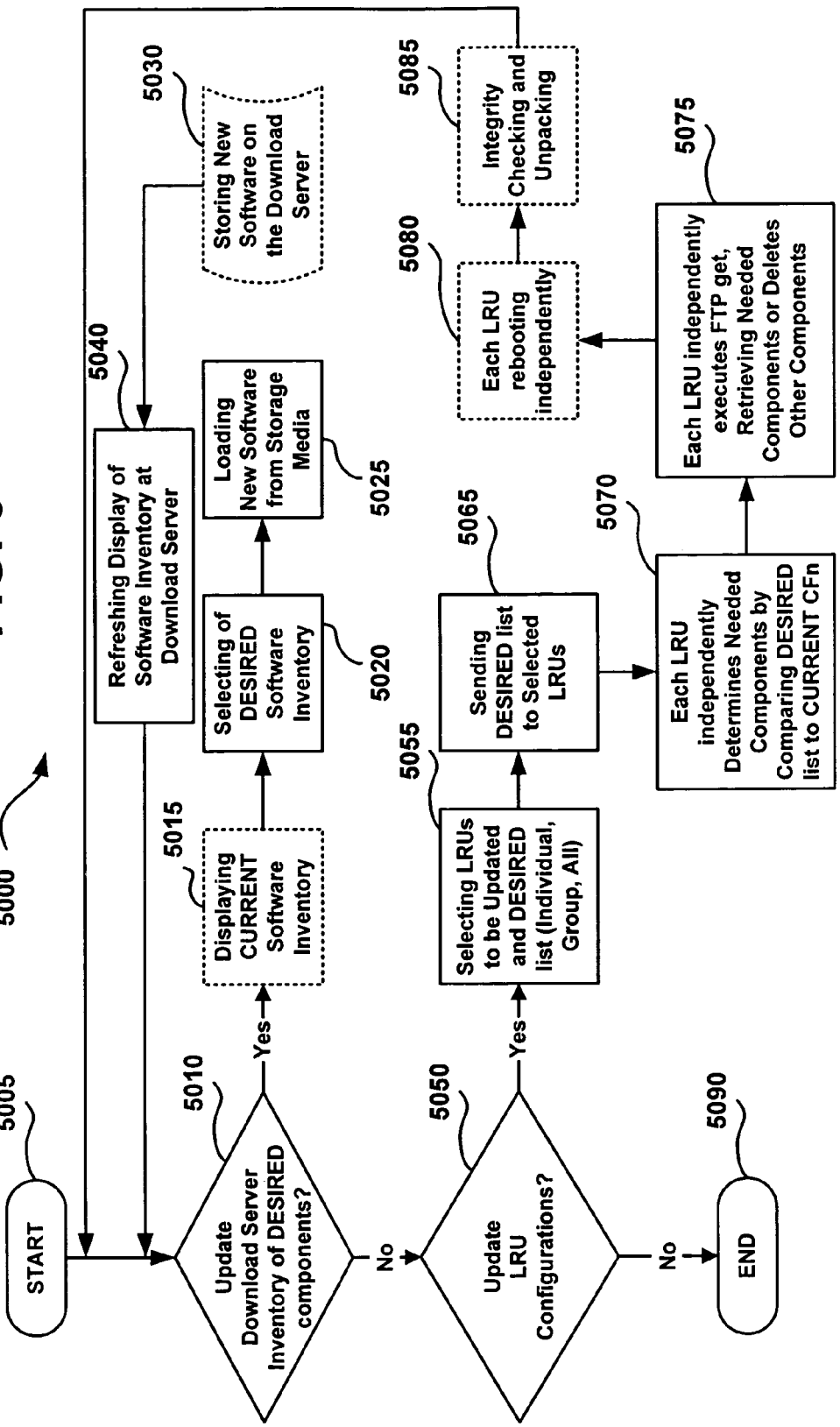
FIG. 5 is a flow chart a method for downloading software to target LRUs according to teachings of the invention.

In the second set of steps in the downloading method 5000 of FIG. 5, after the inventory has been updated at steps 5015-40, step 5050 presents an opportunity to update target LRUs with software components from the inventory loaded into the system 1000 in the first set of steps 5015-5040. If no updating is to occur, the processing proceeds from step 5050 to end at step 5090. However, if updating is to occur, one or more LRUs 1300 to be updated are selected at step 5055. In an embodiment, there may also be a facility for selecting all of the LRUs 1300, or of predefined groups of LRUs 1300 within the system 1000. A list of DESIRED software components is then created by selecting in step 5055 various software components from in the available inventory.

At step 5065, the lists of DESIRED components are sent out to the selected LRUs. FIG. 6a schematically illustrates the download server transmitting a "desired software list" (i.e., the list of DESIRED software components) to the various LRUs 1300 within the system 1000. The download server preferably executes an FTP "put" command to send the list of DESIRED components.

Figure 6B:
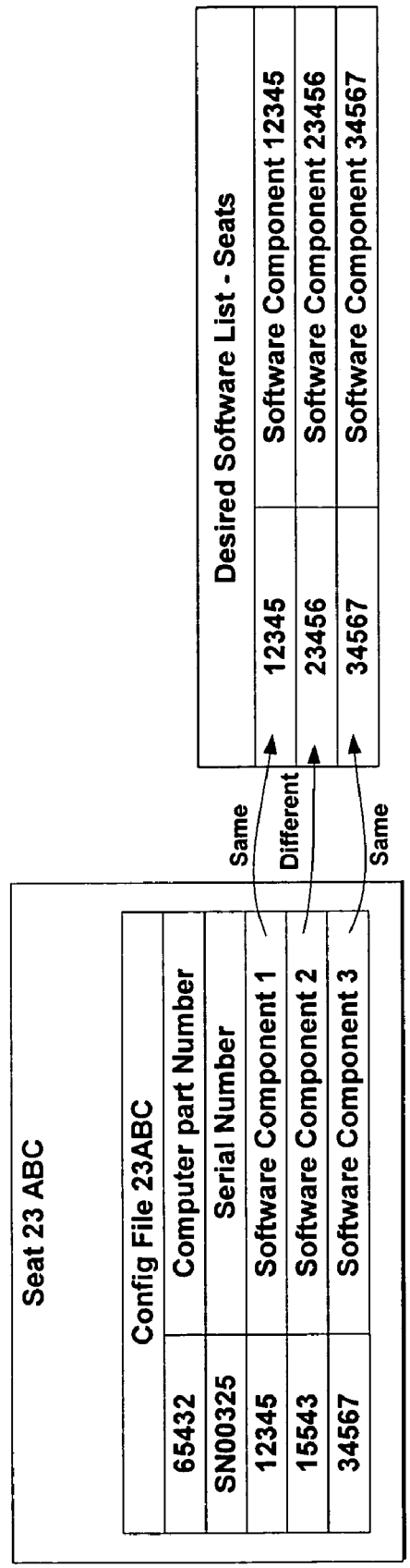
FIG. 6b is a schematic diagram of a configuration file data stack compared to a desired software list.

Referring to step 5070 in the method of FIG. 5, each of the LRUs 1300 independently compares the list of DESIRED software components to its current configuration file to determine whether the LRU 1300 needs any DESIRED software components. FIG. 6b illustrates an example comparison, which could be performed by the LRU 1300 wherein two of the current LRU 1300 software components match the DESIRED software components of the "desired software list," and wherein a software component 15543 does not match the DESIRED software component 23456. The LRU 1300 independently seeks to obtain only the software components that it needs. Referring back to FIG. 5, at step 5075 of the method 5000, each LRU executes an FTP "get" command to retrieve the missing or needed components from the configuration server, as illustrated schematically in FIG. 6c. Also, importantly, if a software component exists in the list of CURRENT software components, but not in the list of DESIRED software components, then that software component is deleted independently by each of the LRUs 1300 within the system 1000 that is completing step 5075.

The selection and deselection of software components could be performed from an exemplary system configuration GUI 7000 illustrated in FIG. 7. The sample system configuration GUI 7000 shows a table of three columns labeled "LRU", "SOFTWARE", and "PART NUMBER". The LRU column lists the configurable LRUs within the system, e.g., "LRU1A", "LRU1B", "LRU2A", and so on. The row labeled "System" corresponds to the computer component designated to act as the configuration server 1200 (FIG. 1). (Various components of the system 1000 as illustrated in FIG. 2a are capable of functioning as the configuration server). Still referring to the system configuration GUI 7000 of FIG. 7, the SOFTWARE column and the PART NUMBER column contain lists of software component names and corresponding parts numbers, respectively. The respective components for each of the LRUs is listed separately. The checkboxes on the left side of FIG. 6 allow the user to indicate which software components are to be installed on the particular LRU (notice that checkboxes do not appear next to the rows with the names of each LRU). As will be appreciated from FIG. 7, more than one checkbox may be selected simultaneously. According to an embodiment (not shown in FIG. 7), the system configuration GUI 7000 could additionally include a means for selecting or deselecting all of the checkboxes.

At the bottom of FIG. 7 are shown menu buttons, labeled "JAZ", "DELETE", etc. The DELETE button is used to remove software components from the list shown for each LRU. To remove a software component from the list shown, a user checks the box next to that component, then presses DELETE (either with a mouse or with his or her finger if it is a touch-sensitive display). The display is preferably then refreshed to show the new system configuration with the deleted software components missing. (This step is indicated by step 5040 in the method 5000 of FIG. 5). The PRINT button is used to generate a printed copy of the system configuration display through a printing device connected to the system. The DONE button is used to return a user of the system to the previous "Update System, Update LRUs, or Done?" menu, previously described.

The menu buttons at the bottom of the display, labeled "JAZ", "CD ROM", and "FLOPPY" are used to load software components into the system that are not already shown in the system configuration display of FIG. 7. When a user of the system presses one of these buttons, for example, the CD ROM button, another display of the software components that have been loaded from that media is shown.

An example, according to an embodiment of the present invention, a GUI 8000 for a media load display of a CD ROM is shown in FIG. 8. Notice that one column, the STATUS column, appears in the media display that does not appear in the system configuration display of FIG. 7. The STATUS column indicates whether or not the software components recorded on the media have successfully loaded onto the download server. In the GUI 8000 FIG. 8, in the row labeled "LRU2A", there is shown in the STATUS column the message "FAILED"; such a message might indicate, for example, that the download server has reached its memory limit and is therefore unable to store the desired software component for LRU2A. A user of the system, for example, a maintenance person could have to delete some files from the download server (or add an additional download server) in order to make room for the additional software components to be loaded. When a user is finished selecting software components from the CD ROM, referring to a bottom of the GUI, the user can either press an UPDATE button to refresh the media load display or a DONE button to return to the system configuration display. According to another embodiment, the media load display could include other buttons for additional features, as desired, such as a DELETE button or a PRINT button (not shown).

Before updating the LRUs with software available from the inventory configuration server, it is desirable to perform the configuration checking method 3000 described above in connection with FIG. 3. In particular, the real time "manually initiated" processing of configuration information is preferably performed close in time prior to the step of sending the "DESIRED" list from the server 1200 to the target LRUs 1300 because it is desirable to be operating from the most current configuration information.

When the LRUs have reported their respective current configuration files, it can be displayed using, for example, a LRU Loading GUI 9000 as illustrated in FIG. 9. GUI 9000 additionally provides section checkboxes button for a user to select a particular group of LRUs to be updated. The ALL button could be selected when all of the LRUs within the LRU group are to be updated. In an embodiment, pressing the SINGLE button while one or more checkboxes for LRU groups are checked causes displays a menu with a list of individual LRUs within an LRU group for selection for update. The final selections from the GUIs 7000, 8000, 9000 are also to define the DESIRED configuration lists sent to each LRU at step 5065 of the method of FIG. 5 and as illustrated in FIG. 6a.

In the GUI 9000 of FIG. 9, the checkboxes can be disabled as shown, for example, next to the System software components. This can be done to ensure that the system remains uniform prior to an initial download, or to block out LRUs that are known to be off line or unavailable. These checkboxes could, however, be enabled for selection after a first configuration and download. It is noted that software configuration of a particular IFES is typically customer dependent and must be kept uniform with the specifications of the system designer.

As mentioned in connection with step 5065 of the downloading method 5000 of FIG. 5, after selecting LRU groups or individual LRUs with either the ALL or the SINGLE button, the download server a list of the DESIRED configuration to each selected LRU. According to an embodiment of the present invention, an Ethernet broadcast or multicast using UDP (rather than TCP) sends the list. Each LRU, upon receipt of the parts list, performs a comparison with its current configuration, and compiles a list of the software components missing from its current configuration, and the LRU 1300 then requests a download of each needed component from the download server. The LRU request, in an embodiment, is made by opening an FTP session with the download server, and by executing an FTP "get" command for each software component needed. A plurality of FTP sessions and downloads can occur in parallel as limited by the bandwidth of the system and processing capacity of the download server. Of course, it is most preferred that the system is capable of handling an FTP "get" request from every LRU simultaneously. It is advantageous for the restricted architecture network 1000 to be capable of downloading software in a substantially parallel manner, resulting in significant time savings for configuring and downloading software to the plurality of LRUs 1300.

According to an embodiment, after the LRU 1300 has received all of the requested new software components, the LRU sends a message to the configuration server 1200 indicating that file transfers are complete. The configuration server marks that LRU as needing "unpack", and if the LRU has received all of the software components necessary for its configuration, the LRU reboots as indicated in step 5080 of the downloading method of FIG. 5. In an embodiment, the unpacking step 5085 is carried out by decompressing a compressed file format, such as a tar, rar or zip file format. The integrity check of 5085 might be any suitable method of checking a file for errors that may have been incurred by the file transfer, which are likely if, for example, the UDP protocol is used for transferring the files rather than the TCP protocol; a suitable method might comprise the calculation of a checksum, a cyclical redundancy check (CRC), or some other integrity checking algorithm.

An advantage of the present invention is that the target LRUs do not need to wait for the configuration and download of software for other target LRUs within the system to be completed before reboot. In an embodiment of the present invention, some or most of the LRUs 1300 within the system may be disconnected or not operational when another LRU 1300 is being configured and is receiving a software download. This creates substantial time savings during design, testing, and troubleshooting of a plurality of computers connected within a restricted architecture network.

After rebooting in step 5080, LRUs 1300 that find downloaded files in a predefined location in their memory begin an integrity check, and if passed, unpack the files, as indicated by step 5085 of FIG. 5. The integrity check is necessary since, in an embodiment, the transfer protocol used may not provide error correction (TCP does, UDP does not); the unpack is necessary since, in an embodiment, the software components might be sent in a compressed or "packed" state that allows them to be sent more quickly.

Finally, the LRU sends its configuration file to the server 1200 (in an embodiment, the configuration server). The new system configuration information is displayed either on a laptop connected to the system by maintenance personnel, or by the management terminal 1100.

It should be understood that various changes and modifications to the presently preferred embodiments described herein would be apparent to those skilled in the art. Such changes and modifications may be made without departing from the spirit and scope of the present invention and without diminishing its attendant advantages.

What is claimed is:

1. A system for checking a configuration of at least one configurable LRU within a restricted architecture network, wherein the system comprises:

at least one configurable LRU which is operable to (i) generate an LRU configuration file in response to an initiation request received at the at least one configurable LRU from a device other than the at least one configurable LRU, the LRU configuration file containing a list of current software components that identifies software components currently residing on the at least one configurable LRU; (ii) transfer its respective LRU configuration file to at least one configuration server; and (iii) request information pertaining to any updated software components that are identified by the at least one configuration server as a desired software component; and at least one configuration server in communication with the at least one configurable LRU which is operable to (i) detect the arrival of LRU configuration files transferred to the at least one configuration server by the at least one configurable LRU; (ii) update a system configuration data file (SCDF) that contains data representing current and previous LRU configurations by setting the current SCDF data at the configuration server to reflect the LRU configuration files transferred by the at least one configurable LRU and by setting the previous SCDF data at the configuration server to reflect any configuration files previously transferred to the at least one configuration server by the at least one configurable LRU; (iii) determining, after updating the SCDF, whether any of the at least one configurable LRU are to receive at least one updated software component identified as a said desired software component from the configuration server and if so, (iv) identifying each of the at least one configurable LRU that are to receive the at least one updated software component as a target LRU, and (v) sending the at least one updated software component and a list of desired software components to each said target LRU;

wherein each said target LRU, upon receiving the at least one updated software component, updates the software components currently residing thereon in accordance with the at least one updated software component, and in doing so, deletes software components which are in the list of current software components but not in the list of desired software components; and wherein the at least one configuration server is further operable to compare the respective LRU configuration file data transferred to the at least one configuration server to data from respective configuration file data previously transferred to the at least one configuration server from the at least one configurable LRU, to determine inconsistencies there between, and to write the inconsistencies to an event log.

2. The system of claim 1, wherein the at least one configuration server is further operable to hold the LRU configuration files transferred to the at least one configuration server in a working directory.

3. The system of claim 2, wherein the at least one configuration server is further operable to delete the LRU configuration files from the working directory.

4. The system of claim 1, wherein the at least one configurable LRU generates the LRU configuration file in response to manual initiation, and wherein the at least one configuration server is further operable to send an initiation request to that at least one configurable LRU.

5. The system of claim 4, wherein the at least one configuration server is operable to send an initiation request to the at least one LRU via an Ethernet multicast.

6. The system of claim 4, wherein the at least one configuration server is operable to send an initiation request to multiple LRUs via an Ethernet broadcast.

7. The system of claim 1, wherein the at least one configurable LRU transfers its respective LRU configuration file in response to the execution of an FTP "put" command.

8. The system of claim 1, wherein the at least one configurable LRU transfers its respective LRU configuration file via FTP.

9. The system of claim 1, wherein the at least one configurable LRU is further operable to store at least part of the SCDF.

10. The system of claim 1, wherein the at least one configurable LRU is further operable to store the respective LRU configuration file after generating the file.

11. The system of claim 1, wherein said at least one of the LRUs automatically performs its operations (i) through (iii), and further automatically updates the software components currently residing thereon in accordance with the at least one updated software component, and automatically deletes the software components which are in the list of current software components but not in the list of desired software components.

12. A method for checking a configuration of at least one configurable LRU within a restricted architecture network, wherein the method comprises:
(i) generating an LRU configuration file in at least one configurable LRU in response to an initiation request received at the at least one configurable LRU from a device other than the at least one configurable LRU, the LRU configuration file containing a list of current software components that identifies software components currently residing on the at least one configurable LRU;
(ii) transferring the at least one configurable LRU's respective LRU configuration file to at least one configuration server;
(iii) requesting, at the configurable LRU, information pertaining to any updated software components that are identified by the at least one configuration server as a desired software component;
(iv) detecting, at the configuration server, the arrival of LRU configuration files transferred to the at least one configuration server by the at least one configurable LRU;
(v) updating, at the configuration server, a system configuration data file (SCDF) that contains data representing current and previous LRU configurations by setting the current SCDF data at the configuration server to reflect the LRU configuration files transferred by the configurable LRU and by setting the previous SCDF data at the configuration server to reflect any configuration files previously transferred to the at least one configuration server by the at least one configurable LRU;
(vi) determining, after updating the SCDF at the configuration server, whether any of the at least one configurable LRU are to receive at least one updated software component identified as a said desired software component from the configuration server and if so,
(vii) identifying each of the at least one configurable LRU that are to receive the at least one updated software component as a target LRU, and
(viii) sending the at least one updated software component and a list of desired software components to each said target LRU;
(ix) updating the software components currently residing on each said target LRU in accordance with the at least one updated software component, and in doing so, deleting software components which are in the list of current software components but not in the list of desired software components; and
(x) comparing the respective LRU configuration file data transferred to the at least one configuration server to data from respective configuration file data previously transferred to the at least one configuration server from the at least one configurable LRU, to determine inconsistencies therebetween, and to write the inconsistencies to an event log.

13. The method of claim 12, further comprising holding the LRU configuration files transferred to the at least one configuration server in a working directory at the at least one configuration server.

14. The method of claim 13, further comprising deleting the LRU configuration files from the working directory at the at least one configuration server.

15. The method of claim 12, wherein generating the LRU configuration file in the at least one configurable LRU is in response to manual initiation, and further comprising sending an initiation request from the at least one configuration server to that at least one configurable LRU.

16. The method of claim 15, wherein sending the initiation request from the at least one configuration server to the at least one configurable LRU is via an Ethernet multicast.

17. The method of claim 15, further comprising sending the initiation request from the at least one configuration server to multiple configurable LRUs via an Ethernet broadcast.

18. The method of claim 12, wherein transferring the at least one configurable LRU's respective LRU configuration file is in response to the execution of an FTP "put" command.

19. The method of claim 12, wherein transferring the at least one configurable LRU's respective LRU configuration file is via FTP.

20. The method of claim 12, further comprising storing at least part of the SCDF at the at least one configurable LRU.

21. The method of claim 12, further comprising storing the LRU configuration file at the respective at least one configurable LRU after generating the file.

22. The method of claim 12, wherein operations (i) through (iii) are automatically performed and further comprising automatically updating, at the at least one configurable LRU, the software components currently residing thereon in accordance with the at least one updated software component, and automatically deleting the software components which are in the list of current software components but not in the list of desired software components.

* * * * *